US012724476B2

(12) United States Patent
Iino

(10) Patent No.: US 12,724,476 B2
(45) Date of Patent: Sep. 1, 2026

(54) ELECTRONIC DEVICE CONFIGURED TO PERFORM SETTING FOR AN IMAGING APPARATUS

(71) Applicant: CANON KABUSHIKI KAISHA, Tokyo (JP)

(72) Inventor: Shuhei Iino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 18/397,090

(22) Filed: Dec. 27, 2023

(65) Prior Publication Data

US 2024/0241381 A1 Jul. 18, 2024

(30) Foreign Application Priority Data

Jan. 13, 2023 (JP) ................................ 2023-003930

(51) Int. Cl.

| | |
|---|---|
| ***G06F 3/01*** | (2006.01) |
| ***G02B 27/01*** | (2006.01) |
| ***H04N 13/332*** | (2018.01) |
| ***H04N 23/60*** | (2023.01) |

(Continued)

(52) U.S. Cl.

CPC ............. *G06F 3/011* (2013.01); *G06F 3/017* (2013.01); *H04N 13/332* (2018.05); *H04N 23/60* (2023.01); *H04N 23/62* (2023.01); *G02B 2027/0134* (2013.01); *G02B 2027/0138* (2013.01); *G02B 2027/014* (2013.01); *H04N 23/611* (2023.01)

(58) Field of Classification Search

None

See application file for complete search history.

(56) References Cited

U.S. PATENT DOCUMENTS

| | | | |
|---|---|---|---|
| 11,624,924 | B2 | 4/2023 | Mima |
| 11,849,100 | B2 | 12/2023 | Aiba |
| 2015/0293644 | A1 | 10/2015 | Watanabe |

(Continued)

FOREIGN PATENT DOCUMENTS

| | | | |
|---|---|---|---|
| EP | 4099682 | A1 | 12/2022 |
| JP | 2008-017501 | A | 1/2008 |

(Continued)

OTHER PUBLICATIONS

May 23, 2024 European Official Action in European Patent Appln. No. 24150144.4.

(Continued)

*Primary Examiner* — SJ Park
*Assistant Examiner* — Caroline E. Depalma
(74) *Attorney, Agent, or Firm* — Venable LLP

(57) ABSTRACT

An electronic device according to the present invention includes: a processor; and a memory storing a program which, when executed by the processor, causes the electronic device to acquire position coordinates designated by a user in a display image obtained by performing first transformation processing on a captured image obtained by an imaging apparatus; transform the position coordinates in the display image into position coordinates in the captured image by a second transformation processing opposite to the first transformation processing; and perform control to perform a setting for the imaging apparatus, on a basis of the position coordinates in the captured image.

18 Claims, 14 Drawing Sheets

(51) Int. Cl.

| | |
|---|---|
| ***H04N 23/611*** | (2023.01) |
| ***H04N 23/62*** | (2023.01) |

(56) References Cited

U.S. PATENT DOCUMENTS

| | | | | |
|---|---|---|---|---|
| 2016/0026253 | A1* | 1/2016 | Bradski ................ | H04N 13/128 345/8 |
| 2016/0086386 | A1* | 3/2016 | Son ...................... | G02B 27/017 345/633 |
| 2017/0026565 | A1* | 1/2017 | Hong ................... | G06V 40/161 |
| 2022/0163802 | A1 | 5/2022 | Mima | |
| 2022/0385829 | A1 | 12/2022 | Kinoshita | |
| 2022/0385882 | A1 | 12/2022 | Aiba | |

FOREIGN PATENT DOCUMENTS

| | | | | | |
|---|---|---|---|---|---|
| JP | 2015094788 | A | * | 5/2015 | |
| JP | 2022-082127 | A | | 6/2022 | |
| JP | 2022-183845 | A | | 12/2022 | |
| KR | 20140130313 | A | * | 11/2014 | ......... G02B 27/0172 |

OTHER PUBLICATIONS

Apr. 23, 2026 European Official Action in European Patent Appln. No. 24150144.4.

* cited by examiner

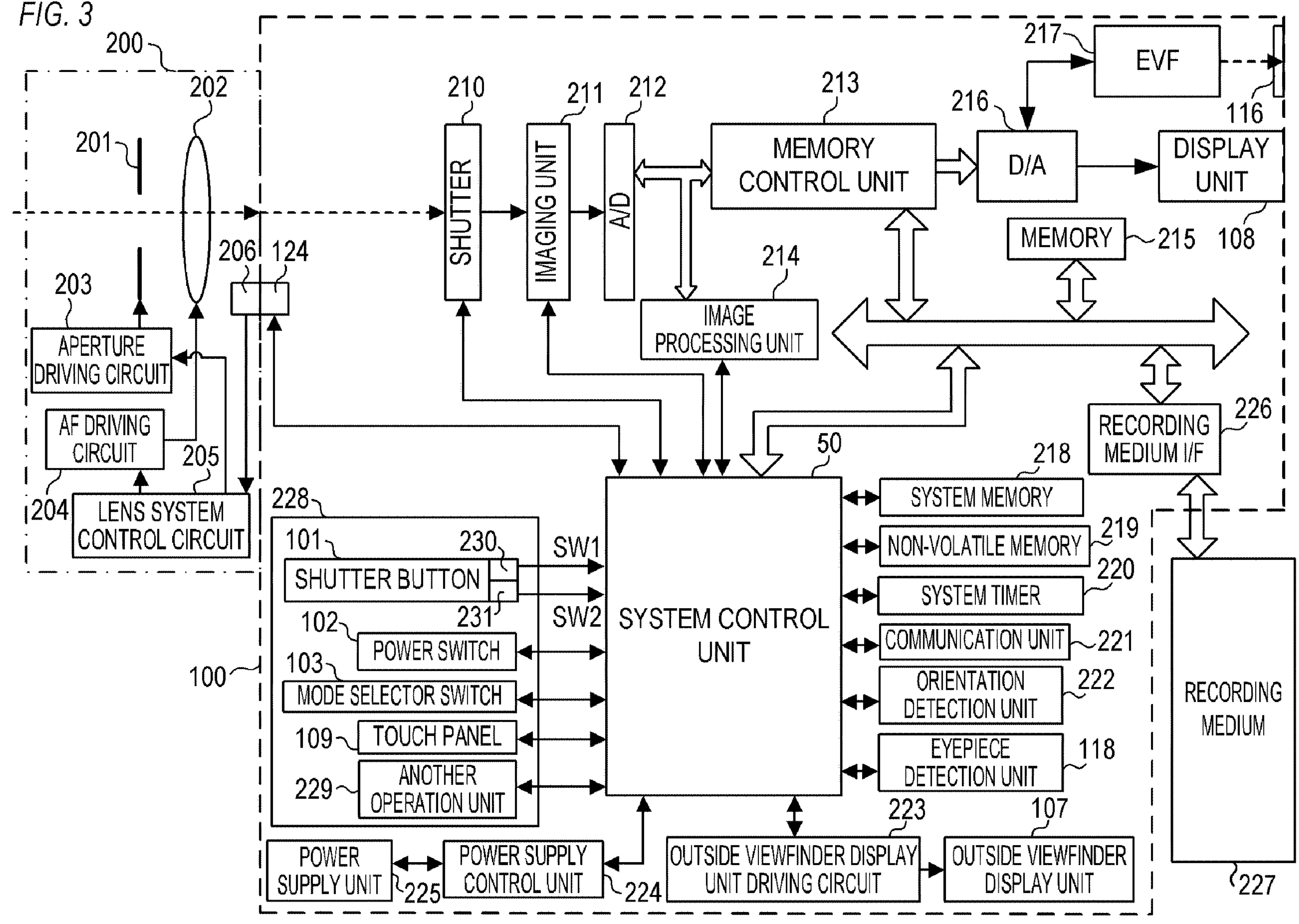
FIG. 3
200
201
202
203
APERTURE DRIVING CIRCUIT
AF DRIVING CIRCUIT
204
205
LENS SYSTEM CONTROL CIRCUIT
206
124
100
210
SHUTTER
211
IMAGING UNIT
212
A/D
213
MEMORY CONTROL UNIT
214
IMAGE PROCESSING UNIT
216
D/A
217
EVF
116
DISPLAY UNIT
108
MEMORY
215
RECORDING MEDIUM I/F
226
RECORDING MEDIUM
227
50
SYSTEM CONTROL UNIT
SYSTEM MEMORY
218
NON-VOLATILE MEMORY
219
SYSTEM TIMER
220
COMMUNICATION UNIT
221
ORIENTATION DETECTION UNIT
222
EYEPIECE DETECTION UNIT
118
228
101
SHUTTER BUTTON
230
231
SW1
SW2
102
POWER SWITCH
103
MODE SELECTOR SWITCH
109
TOUCH PANEL
229
ANOTHER OPERATION UNIT
POWER SUPPLY UNIT
225
POWER SUPPLY CONTROL UNIT
224
223
OUTSIDE VIEWFINDER DISPLAY UNIT DRIVING CIRCUIT
107
OUTSIDE VIEWFINDER DISPLAY UNIT 100
300
304
302R
305
210
211
212
301R
SHUTTER
IMAGING UNIT
A/D
301L
124
306
302L
303

505(506a)
506b
506c
506d
512a
506e
500
512b

515

500
CPU
501
MEMORY
502
NON-VOLATILE MEMORY
503
IMAGE PROCESSING UNIT
504
DISPLAY
505
SELF-POSITION/ SURROUNDING ENVIRONMENT ESTIMATION UNIT
514
IMAGING UNIT
515
550
OPERATION UNIT
506
TOUCH PANEL 506a
GESTURE DETECTION UNIT 506f
STORAGE MEDIUM I/F
507
STORAGE MEDIUM
508
EXTERNAL I/F
509
COMMUNICATION I/F
510
NET
511
CONTROLLER
516
SOUND OUTPUT UNIT
512
ORIENTATION DETECTION UNIT
513

FIG. 6

ELECTRONIC DEVICE CONFIGURED TO PERFORM SETTING FOR AN IMAGING APPARATUS

BACKGROUND OF THE INVENTION

Field of the Invention

The present invention relates to an electronic device, and more particularly to a technique for performing setting for an imaging apparatus.

Description of the Related Art

A technique has been proposed in which two images having a parallax are acquired using two optical systems, and the two images are displayed in a stereoscopically viewable manner by a head-mounted display device (HMD) such as VR goggles or AR glasses. A technique has also been proposed in which a digital camera (camera) is connected to an external display device, and a video (live view video) captured by the digital camera is displayed on the display device (JP 2022-183845 A). A technique of displaying a live view video on an HMD (xR live view) has also been proposed (JP 2022-082127 A).

A user checking a live view video on the HMD needs to remove the HMD in order to operate the camera (to see the camera). Therefore, the user cannot easily perform a camera setting. JP 2022-082127 A describes that a user operates a camera while wearing AR glasses. In the case of the AR glasses, the user can see the real space (camera existing in the real space) through the live view video. However, the visibility of the real space is reduced by the live view video. Therefore, even in the case of the AR glasses, the user cannot easily perform the camera setting.

SUMMARY OF THE INVENTION

The present invention provides a technique that enables a user to easily perform a camera setting while wearing an HMD.

An electronic device according to the present invention includes: a processor; and a memory storing a program which, when executed by the processor, causes the electronic device to acquire position coordinates designated by a user in a display image obtained by performing first transformation processing on a captured image obtained by an imaging apparatus; transform the position coordinates in the display image into position coordinates in the captured image by a second transformation processing opposite to the first transformation processing; and perform control to perform a setting for the imaging apparatus, on a basis of the position coordinates in the captured image.

Further features of the present invention will become apparent from the following description of exemplary embodiments with reference to the attached drawings.

BRIEF DESCRIPTION OF THE DRAWINGS

FIG. 3 is a block diagram of the camera;

FIG. 6 is a flowchart indicating processing of the camera;

DESCRIPTION OF THE EMBODIMENTS

Hereinafter, embodiments of the present invention will be described in conjunction with the accompanying drawings.

Configuration of System

Figure 1:
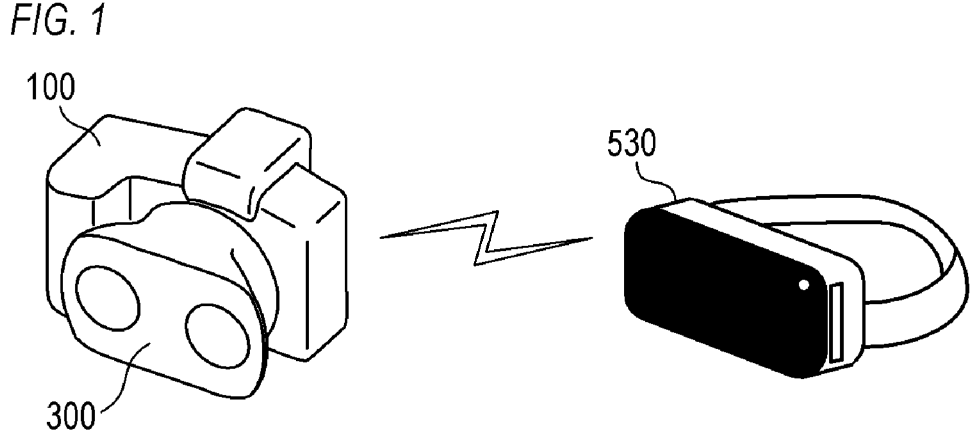
FIG. 1 is a schematic diagram illustrating a configuration of a system.

FIG. 1 is a schematic diagram illustrating an example of a configuration of a system according to the present embodiment. The system of FIG. 1 includes a digital camera (camera) 100 and VR goggles 530. A lens unit 300 is attached to the camera 100. The camera 100 and the lens unit 300 are connected to communicate with each other, and the lens unit 300 transmits lens information (to be described later) to the digital camera 100. The camera 100 and the VR goggles 530 are connected to communicate with each other in a wireless or wired manner, and transmit and receive a variety of information and data such as lens information and a live-view image (live-view image data). When the camera 100 transmits a live view image to the VR goggles 530, the live view image is displayed on a display 505 (to be described later) of the VR goggles 530 (VR live view). At this time, in response to an instruction from the user, a CPU 501 (to be described later) of the VR goggles 530 performs various operations such as image processing on the live-view image, and displays the processing result on the display 505 of the VR goggles 530.

Note that the display device connected to the camera 100 is not limited to the VR goggles 530, and may be another head-mounted display device (HMD) such as AR glasses, for example. Any display device may be connected to the camera 100 as long as the display device can perform VR display (to be described later). The display device may be directly connected to the camera 100, or may be connected to the camera 100 via another electronic device (for example, an information processing apparatus such as a personal computer).

External Configuration of Camera

Figure 2A:
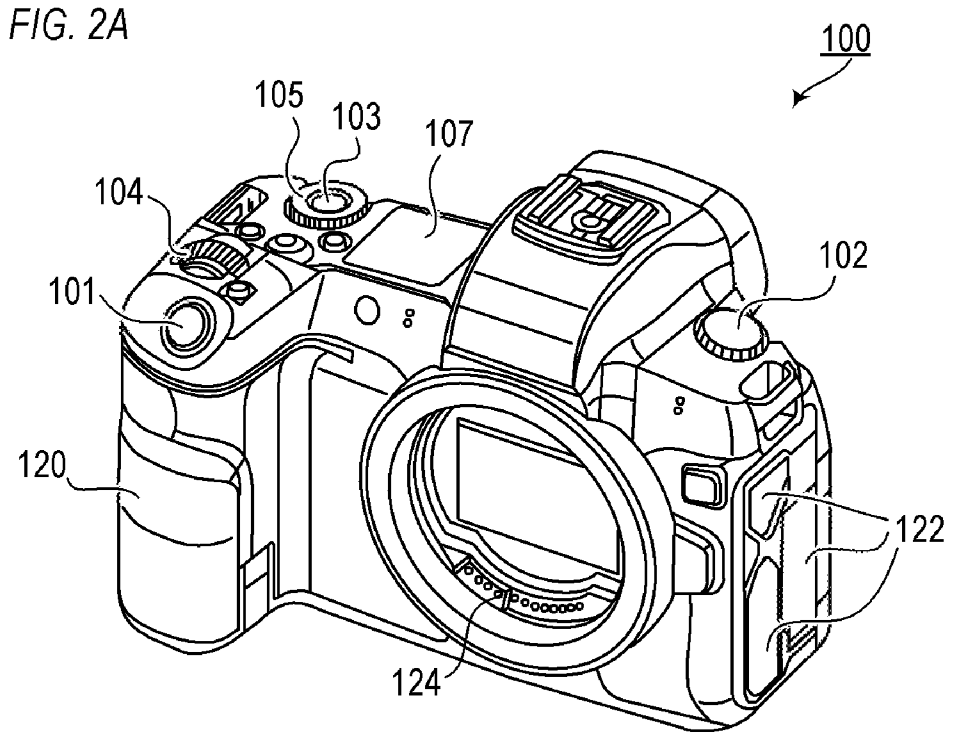
FIGS. 2A and 2B are external views of a camera.
Figure 2B:
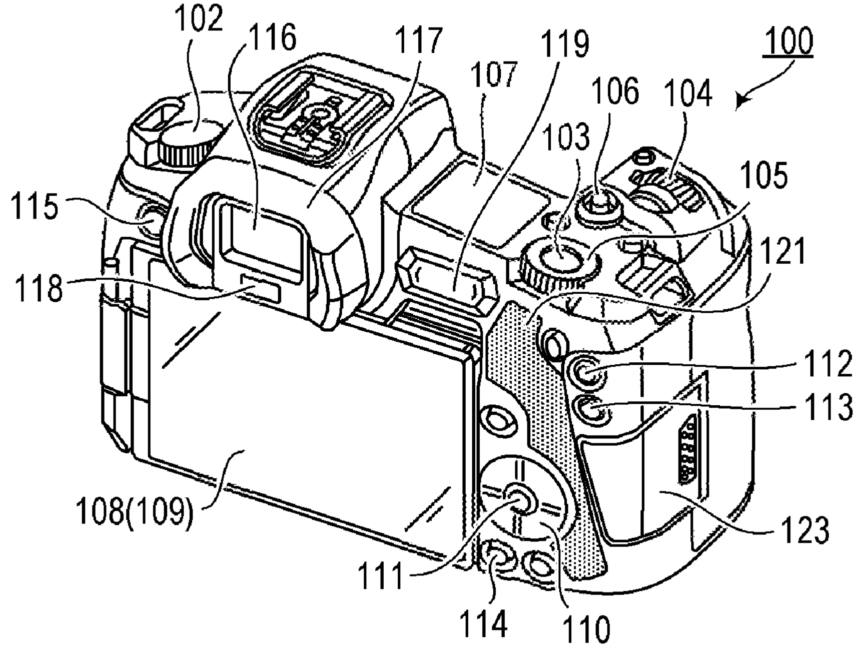

FIGS. 2A and 2B are external views illustrating an example of an external configuration of the camera 100. FIG. 2A is a perspective view of the camera 100 viewed from the front side. FIG. 2B is a perspective view of the camera 100 viewed from the back side.

The camera 100 includes, on its upper surface, a shutter button 101, a power switch 102, a mode selector switch 103, a main electronic dial 104, a sub-electronic dial 105, a movie button 106, and an outside viewfinder display unit 107. The shutter button 101 is an operation member for providing a shooting preparation instruction or a shooting instruction. The power switch 102 is an operation member for turning on or off the power of the camera 100. The mode selector switch 103 is an operation member for switching among various modes. The main electronic dial 104 is a rotary operation member for changing setting values such as a shutter speed and an aperture value. The sub-electronic dial 105 is a rotary operation member for moving a selection frame (cursor) and feeding images. The movie button 106 is an operation member for providing an instruction to start or stop movie shooting (recording). The outside viewfinder display unit 107 displays various setting values such as a shutter speed and an aperture value.

The camera 100 includes, on its back surface, a display unit 108, a touch panel 109, a direction key 110, a SET button 111, an AE lock button 112, an enlargement button 113, a playback button 114, a menu button 115, an eyepiece portion 116, an eyepiece detection unit 118, and a touch bar 119. The display unit 108 displays various images and various information. The touch panel 109 is an operation member for detecting a touch operation on the display screen (touch screen) of the display unit 108. The direction key 110 is an operation member including a key (four-direction key) that can be pressed in up, down, left, and right directions. Processing corresponding to the pressed position of the direction key 110 can be performed. The SET button 111 is an operation member to be pressed mainly when a selected item is determined. The AE lock button 112 is an operation member to be pressed when an exposure state is fixed in a shooting standby state. The enlargement button 113 is an operation member for switching on or off an enlargement mode in live view display (LV display) of a shooting mode. In the case where the enlargement mode is switched on, a live-view image (LV image) is enlarged or reduced by operating the main electronic dial 104. In addition, the enlargement button 113 is used when, in a playback mode, a playback image is enlarged or an enlargement ratio is increased. The playback button 114 is an operation member for switching between the shooting mode and the playback mode. By pressing the playback button 114 in the shooting mode, the mode shifts to the playback mode, so that the latest one of images recorded in a recording medium 227, which will be described later, can be displayed on the display unit 108.

The menu button 115 is an operation member to be pressed for displaying a menu screen, which enables various settings, on the display unit 108. A user can intuitively make the various settings by using the menu screen displayed on the display unit 108, the direction key 110, and the SET button 111. The eyepiece portion 116 is a portion through which the user looks into an eyepiece viewfinder (eye-level finder) 117 with his/her eye approaching the eyepiece viewfinder 117. The user can visually confirm video displayed on an electronic view finder (EVF) 217, which will be described later, in the camera 100 through the eyepiece portion 116. The eyepiece detection unit 118 is a sensor for detecting whether an eye of the user is placed near the eyepiece portion 116 (eyepiece viewfinder 117).

The touch bar 119 is a linear touch operation member (line touch sensor) capable of receiving a touch operation. The touch bar 119 is disposed at a position that allows a touch operation (allows a touch) with the thumb of the right hand in a state in which a grip portion 120 is gripped by the right hand (a state in which the grip portion 120 is gripped by the little finger, the third finger, and the middle finger of the right hand) such that the shutter button 101 can be pressed by the index finger of the right hand. That is, the touch bar 119 can be operated in a state (shooting orientation) in which the user brings his/her eye close to the eyepiece viewfinder 117 to look at the eyepiece portion 116 and holds the camera 100 so as to be able to press the shutter button 101 at any time. The touch bar 119 can accept operation such as tapping operation on the touch bar 119 (touch and release without moving the touch position within a prescribed period of time) and sliding operation to the left or right (touch and then move the touch position while keeping the touch). The touch bar 119 is an operation member that is different from the touch panel 109, and does not have a display function. The touch bar 119 acts as, for example, a multi-function bar (M-Fn bar) where various functions can be allocated.

In addition, the camera 100 also has a grip portion 120, a thumb rest part 121, a terminal cover 122, a lid 123, and a communication terminal 124. The grip portion 120 is a holding portion formed in a shape easy for the user to grip with the right hand when the user holds the camera 100. The shutter button 101 and the main electronic dial 104 are disposed at positions that allow the user to operate the shutter button 101 and the main electronic dial 104 with the index finger of the right hand in a state in which the user holds the camera 100 while gripping the grip portion 120 with the little finger, the third finger, and the middle finger of the right hand. In the same state, the sub-electronic dial 105 and the touch bar 119 are positioned so that these members can be operated by the thumb of the right finger. The thumb rest part 121 (thumb standby position) is a grip portion provided at a point where the right thumb holding the grip portion 120 is easily placed without operating any of the operation members on the back side of the camera 100. The thumb rest part 121 may be made of a rubber material to enhance the holding power (gripping feeling). The terminal cover 122 protects connectors such as connection cables that connect the camera 100 to external devices (external equipment). The lid 123 closes a slot for storing the recording medium 227, which will be described later, so that the recording medium 227 and the slot are protected. The communication terminal 124 is a terminal for communicating with a lens unit side (a lens unit 200 to be described later and the lens unit 300) that is attachable to and detachable from the camera 100.

Internal Configuration of Camera

FIG. 3 is a block diagram illustrating an example of the configuration of the camera 100. The same constituent elements as those of FIGS. 2A and 2B are indicated by the same reference numerals as in FIGS. 2A and 2B, and an explanation thereof is optionally omitted. In FIG. 3, the lens unit 200 is attached to the camera 100.

First, the lens unit 200 will be described. The lens unit 200 is a type of an interchangeable-lens unit attachable to and detachable from the camera 100. The lens unit 200 is a single-lens unit (monocular lens unit) and is an example of a normal lens unit. The lens unit 200 has an aperture 201, a lens 202, an aperture driving circuit 203, an AF (auto focus) driving circuit 204, a lens system control circuit 205, and a communication terminal 206.

The aperture 201 is configured with an adjustable aperture diameter. The lens 202 includes a plurality of lenses. The aperture driving circuit 203 adjusts a quantity of light by controlling the aperture diameter of the aperture 201. The AF driving circuit 204 adjusts the focus by driving the lens 202. The lens system control circuit 205 controls the aperture driving circuit 203, the AF driving circuit 204, and the like in response to instructions from a system control unit 50 to be described later. The lens system control circuit 205 controls the aperture 201 via the aperture driving circuit 203. Further, the lens system control circuit 205 adjusts the focus by changing the position of the lens 202 via the AF driving circuit 204. The lens system control circuit 205 can communicate with the camera 100. Specifically, the communication is performed via the communication terminal 206 of the lens unit 200 and the communication terminal 124 of the camera 100. The communication terminal 206 is a terminal that allows the lens unit 200 to communicate with the camera 100 side.

The camera 100 will be described below. The camera 100 includes a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal-plane shutter capable of freely controlling the exposure time of the imaging unit 211 based on an instruction of the system control unit 50. The imaging unit 211 is an imaging element (image sensor) including a CCD or a CMOS element that convert an optical image into an electrical signal. The imaging unit 211 may include an imaging-area phase-difference sensor for outputting defocus-amount information to the system control unit 50. The A/D converter 212 converts an analog signal, which is outputted from the imaging unit 211, into a digital signal. The image processing unit 214 performs predetermined image processing (such as pixel interpolation, resizing processing such as shrinking, and color conversion processing) on data from the A/D converter 212 or data from the memory control unit 213. Moreover, the image processing unit 214 performs predetermined arithmetic processing by using captured image data, and the system control unit 50 performs exposure control and distance measurement control based on the obtained result of arithmetic processing. This processing includes TTL (through-the-lens) AF processing, AE (auto exposure) processing, and EF (flash pre-flash) processing. Furthermore, the image processing unit 214 performs predetermined arithmetic processing by using the captured image data, and the system control unit 50 performs TTL auto white balance (AWB) processing based on the obtained result of arithmetic processing.

Image data from the A/D converter 212 is written into the memory 215 via the image processing unit 214 and the memory control unit 213. Alternatively, image data from the A/D converter 212 is written into the memory 215 via the memory control unit 213 without the intervention of the image processing unit 214. The memory 215 stores image data that is obtained by the imaging unit 211 and is converted into digital data by the A/D converter 212, and image data to be displayed on the display unit 108 or the EVF 217. The memory 215 includes a storage capacity sufficient to store a predetermined number of still images, and a predetermined length of movie and sound. The memory 215 also serves as a memory for image display (video memory).

The D/A converter 216 converts image data for display stored in the memory 215 into an analog signal, and supplies the analog signal to the display unit 108 or the EVF 217. Accordingly, the image data for display written into the memory 215 is displayed on the display unit 108 or the EVF 217 via the D/A converter 216. The display unit 108 and the EVF 217 provide display in response to the analog signal from the D/A converter 216. The display unit 108 and the EVF 217 are, for example, LCD or organic EL displays. The digital signal that is A/D converted by the A/D converter 212 and is accumulated in the memory 215 is converted into the analog signal in the D/A converter 216, and the analog signal is sequentially transferred to and displayed on the display unit 108 or the EVF 217, so that live-view display is performed.

The system control unit 50 is a control unit including at least one processor and/or at least one circuit. That is, the system control unit 50 may be a processor, a circuit, or a combination of a processor and a circuit. The system control unit 50 controls the entire camera 100. The system control unit 50 implements the processing of flowcharts, which will be described later, by running programs recorded in a non-volatile memory 219. In addition, the system control unit 50 also performs display control for example by controlling the memory 215, the D/A converter 216, the display unit 108, the EVF 217, and the like. The system control unit 50 can identify the type of lens unit attached to the camera 100 by communicating through the communication terminal 124 and the communication terminal 206.

The camera 100 also includes a system memory 218, the non-volatile memory 219, a system timer 220, a communication unit 221, an orientation detection unit 222, and the eyepiece detection unit 118.

For example, a RAM is used as the system memory 218. In the system memory 218, constants, variables, and programs read from the non-volatile memory 219 for the operation of the system control unit 50 are deployed. The non-volatile memory 219 is an electrically erasable and recordable memory. For example, an EEPROM is used as the non-volatile memory 219. In the non-volatile memory 219, constants, programs, etc. for the operation of the system control unit 50 are recorded. The program as used herein includes programs for executing the flowcharts to be described later. The system timer 220 is a time measurement unit that measures a time used for various kinds of control and a time of a built-in clock. The communication unit 221 transmits and receives a video signal and an audio signal to and from external devices connected wirelessly or with a cable. The communication unit 221 can also be connected to a wireless local area network (LAN) and the Internet. Moreover, the communication unit 221 can communicate with external devices also via Bluetooth (registered trademark) and Bluetooth Low Energy. The communication unit 221 can transmit an image captured by the imaging unit 211 (including a live image) and an image recorded in the recording medium 227, and can receive an image and other various kinds of information from external devices. The orientation detection unit 222 detects an orientation (inclination) of the camera 100 with respect to the direction of gravity. On the basis of the orientation detected by the orientation detection unit 222, the tilt angle of the camera 100 in the horizontal (left-to-right) or vertical (up-and-down; front-and-back) direction can be detected. In addition, it is possible to determine whether an image captured in the imaging unit 211 is an image captured when the camera 100 is held laterally or an image captured when the camera 100 is held vertically based on the orientation detected in the orientation detection unit 222. The system control unit 50 can add orientation information corresponding to the orientation detected in the orientation detection unit 222 to an image file of the image captured in the imaging unit 211, and rotate the image according to the detected orientation. The orientation detection unit 222 can also be used to detect the movement of the camera 100 (whether it is panning, tilting, lifting, stationary, or the like). For example, an acceleration sensor or a gyro sensor can be used for the orientation detection unit 222.

The eyepiece detection unit 118 can detect an object approaching the eyepiece portion 116 (eyepiece viewfinder 117). For example, an infrared proximity sensor can be used as the eyepiece detection unit 118. When an object approaches the eyepiece portion 116, infrared light from a light emitting part of the eyepiece detection unit 118 is reflected by the object and is received by a light receiving part of the infrared proximity sensor. A distance from the eyepiece portion 116 to the object can be determined according to the quantity of received infrared light. In this way, the eyepiece detection unit 118 performs eye approach detection that detects a distance between the eyepiece portion 116 and the object approaching the eyepiece portion 116. The eyepiece detection unit 118 is an eye approach detection sensor that detects approach of an eye (object) to the eyepiece portion 116 (i.e., eye approach) and separation of the eye (object) from the eyepiece portion 116 (i.e., eye separation). In a case where an object approaching the eyepiece portion 116 within a predetermined distance is detected in a non-eye approach state (non-approach state), it is detected that an eye has approached. On the other hand, in a case where the object of which the approach has been detected is separated from the eyepiece portion 116 by a predetermined distance or longer in an eye approach state (approach state), it is detected that the eye has been separated. Different threshold values may be used for detecting the approach of an object and detecting the separation of the object with, for example, a hysteresis. In addition, it is assumed that, after the eye approach is detected, the eye approach state is maintained until the eye separation is detected. It is assumed that, after the eye separation is detected, the non-eye approach state is maintained until the eye approach is detected. The system control unit 50 switches between display (display state) and non-display (non-display state) of each of the display unit 108 and the EVF 217 in accordance with the state detected by the eyepiece detection unit 118. Specifically, in a case where at least the shooting standby state is established and a switching setting for a display destination is set to automatic switching, the display unit 108 is turned on as the display destination while the EVF 217 is set to non-display during the non-eye approach state. On the other hand, the EVF 217 is turned on as the display destination while the display unit 108 is set to non-display during the eye approach state. Note that the eyepiece detection unit 118 is not limited to the infrared proximity sensor, and other sensors may be used as the eyepiece detection unit 118 as long as the sensors can detect the state which can be regarded as the eye approach.

The camera 100 also has the outside viewfinder display unit 107, an outside viewfinder display unit driving circuit 223, a power supply control unit 224, a power supply unit 225, a recording medium I/F 226, and an operation unit 228.

The outside viewfinder display unit 107 is driven by the outside viewfinder display unit driving circuit 223 and displays various setting values for the camera 100 such as a shutter speed and an aperture value. The power supply control unit 224 includes a battery detection circuit, a DC-DC converter, and a switch circuit that switches the block to be energized, and detects whether a battery is installed, the type of battery, and the remaining battery level. Moreover, the power supply control unit 224 controls the DC-DC converter based on the detection result and an instruction from the system control unit 50 and supplies a required voltage to parts including the recording medium 227 for a necessary period. The power supply unit 225 is a primary battery such as alkaline and lithium batteries, a secondary battery such as NiCd, NiMH, and Li batteries, or an AC adapter. The recording medium I/F 226 is an interface to a recording medium 227 such as a memory card and a hard disk. The recording medium 227 is, for example, a memory card for recording captured images and includes a semiconductor memory and a magnetic disk. The recording medium 227 may be attachable to and detachable from the camera 100 or may also be embedded in the camera 100.

The operation unit 228 is an input unit that receives an operation from the user (user operation). The operation unit 228 is used for inputting various instructions to the system control unit 50. The operation unit 228 includes the shutter button 101, the power switch 102, the mode selector switch 103, the touch panel 109, and another operation unit 229. The another operation unit 229 include the main electronic dial 104, the sub-electronic dial 105, the movie button 106, the direction key 110, the SET button 111, the AE lock button 112, the enlargement button 113, the playback button 114, the menu button 115, and the touch bar 119.

The shutter button 101 includes a first shutter switch 230 and a second shutter switch 231. The first shutter switch 230 is turned on halfway through the operation of the shutter button 101 in response to so-called half-press (shooting preparation instruction), and outputs a first shutter switch signal SW1. The system control unit 50 starts shooting preparation processing such as AF processing, AE processing, AWB processing, and EF processing in response to the first shutter switch signal SW1. The second shutter switch 231 is turned on at the completion of the operation of the shutter button 101 in response to so-called full-press (shooting instruction), and outputs a second shutter switch signal SW2. In response to the second shutter switch signal SW2, the system control unit 50 starts a sequence of shooting involving reading of a signal from the imaging unit 211, generating an image file including the captured image, and writing of the generated image file into the recording medium 227.

The mode selector switch 103 switches the operation mode of the system control unit 50 to any one of a still image shooting mode, a motion image shooting mode, and a playback mode. The still-image shooting mode includes modes such as an auto shooting mode, an auto scene-determination mode, a manual mode, an aperture-priority mode (Av mode), a shutter-speed priority mode (Tv mode), and a program AE mode (P mode). There is also a various scene mode which has shooting settings for different shooting scenes, a custom mode, and the like. The user can directly switch the operation mode to any of the above-described shooting modes with the mode selector switch 103. Alternatively, the user can temporarily switch a screen to a list screen of the shooting modes with the mode selector switch 103 and then selectively switch the operation mode to any of the plurality of displayed modes with the operation unit 228. Likewise, the movie shooting mode may include a plurality of modes.

The touch panel 109 is a touch sensor for detecting various touching operations for the display screen of the display unit 108 (the operation screen of the touch panel 109). The touch panel 109 and the display unit 108 can be integrated into a single unit. For example, the touch panel 109 has the transmittance of light that does not hinder the display of the display unit 108, and is mounted to an upper layer of the display surface of the display unit 108. Input coordinates on the touch panel 109 are then associated with display coordinates on the display surface of the display unit 108. In this way, a graphical user interface (GUI) can be configured as if the user can directly manipulate the screen displayed on the display unit 108. The touch panel 109 can use any of various methods including resistive, capacitive, surface acoustic wave, infrared, electromagnetic induction, image recognition, and optical sensor methods. Depending on the methods, there are a method of detecting a touch based on contact with the touch panel 109, and a method of detecting a touch based on approach of a finger or a pen to the touch panel 109, but any method may be adopted.

For the touch panel 109, the system control unit 50 can detect the following operations or states:

An operation in which a finger or a pen that is not in contact with the touch panel 109 newly touches the touch panel 109, that is, a start of a touch (hereinafter referred to as touch-down).

A state in which the finger or the pen is in contact with the touch panel 109 (hereinafter referred to as touch-on).

An operation in which the finger or the pen is moving while being in contact with the touch panel 109 (hereinafter referred to as touch-move).

An operation in which the finger or the pen that is in contact with the touch panel 109 is separated from (released from) the touch panel 109, that is, an end of the touch (hereinafter referred to as touch-up).

A state in which nothing is in contact with the touch panel 109 (hereinafter referred to as touch-off).

When the touch-down is detected, the touch-on is detected at the same time. After the touch-down, the touch-on is continuously detected unless the touch-up is detected. Also, when the touch-move is detected, the touch-on is continuously detected. Even if the touch-on is detected, the touch-move is undetected as long as the touch position is not moved. After the touch-up of all the fingers and the pen having been in contact with the touch panel 109 is detected, the touch-off is established.

These operations and states and the position coordinates of the finger or the pen that is in contact with the touch panel 109 are notified to the system control unit 50 through an internal bus. The system control unit 50 determines what kind of operation (touch operation) has been performed on the touch panel 109, based on the notified information. With regard to the touch-move, a movement direction of the finger or the pen moving on the touch panel 109 can be determined for each vertical component and for each horizontal component on the touch panel 109, based on change of the position coordinates. When the touch-move for a predetermined distance or longer is detected, it is determined that a slide operation has been performed. An operation in which a finger is swiftly moved by a certain distance while being in contact with the touch panel 109 and is separated is referred to as a flick. In other words, the flick is an operation in which the finger is swiftly slid on the touch panel 109 so as to flick the touch panel 109. When the touch-move for a predetermined distance or longer at a predetermined speed or higher is detected and the touch-up is then detected, it is determined that the flick has been performed (it can be determined that the flick has been performed subsequently to the slide operation). Furthermore, a touch operation in which a plurality of locations (e.g., two locations) are both touched (multi-touched) and the touch positions are brought close to each other is referred to as a pinch-in, and a touch operation in which the touch positions are moved away from each other is referred to as a pinch-out. To pinch out and to pinch are collectively called a pinching operation (or simply referred to as a pinch).

Configuration of Lens Unit

Figure 4:
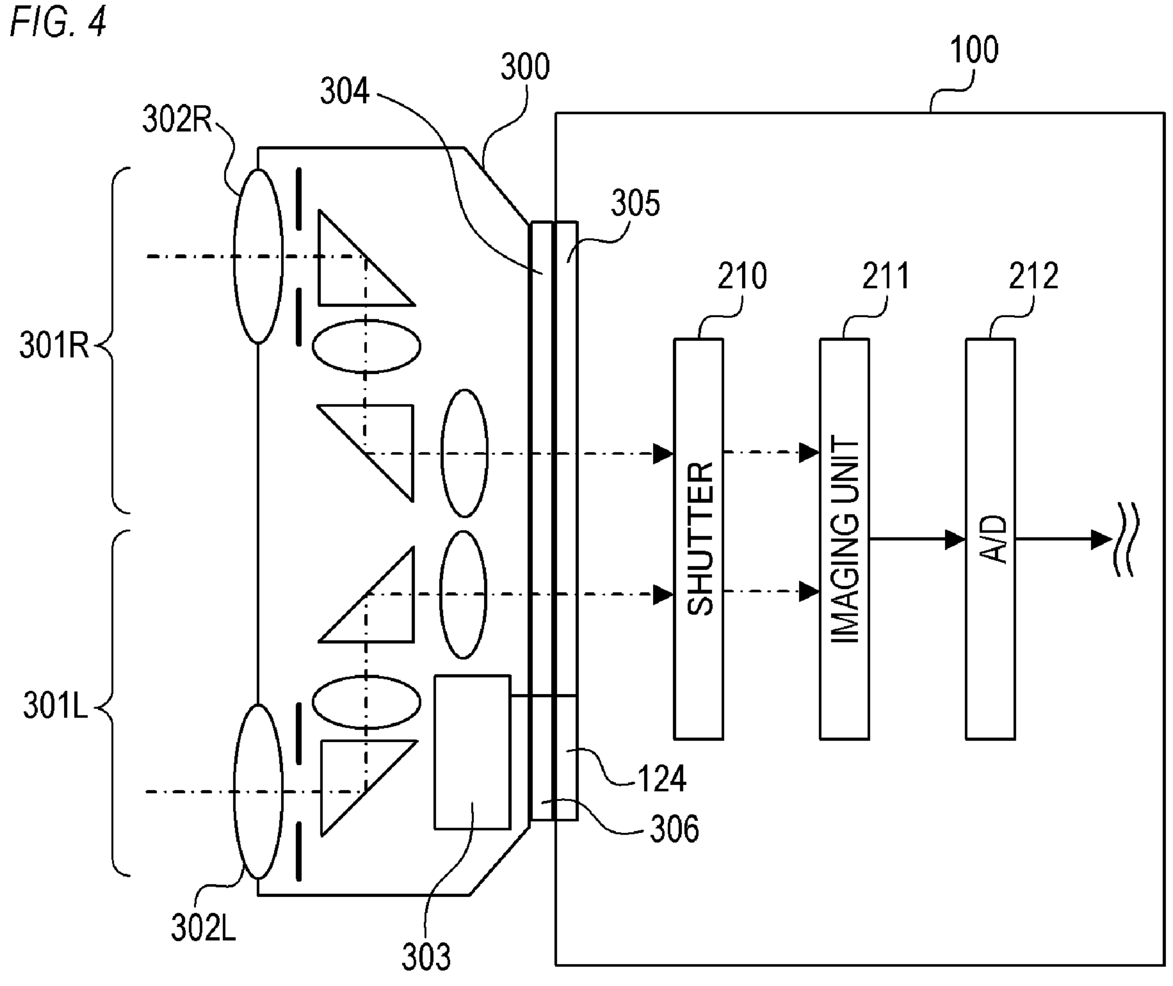
FIG. 4 is a schematic diagram illustrating a configuration of a lens unit.

FIG. 4 is a schematic diagram illustrating an example of the configuration of the lens unit 300. In FIG. 4, the lens unit 300 is attached to the camera 100. As the lens unit 300 is attached, the camera 100 can capture a single image (still or moving image) that includes two image areas with a prescribed parallax. In the camera 100 illustrated in FIG. 4, the same constituent elements as those of FIG. 3 are indicated by the same reference numerals as in FIG. 3, and an explanation thereof is optionally omitted.

The lens unit 300 is a type of an interchangeable-lens unit attachable to and detachable from the camera 100. The lens unit 300 is a dual-lens unit capable of capturing a right image and a left image having a parallax. The lens unit 300 has two optical systems (shooting lenses), and each of the two optical systems can capture an image in a viewing angle range as wide as approximately 180 degrees. Specifically, each of the two optical systems of the lens unit 300 can image an object corresponding to a field of view (angle of view) of 180 degrees in a left-to-right direction (a horizontal angle, an azimuth angle, a yaw angle) and 180 degrees in an up-and-down direction (a vertical angle, an elevation angle, a pitch angle). That is, each of the two optical systems can capture a front hemispherical area.

The lens unit 300 has a right-eye optical system 301R including multiple lenses and reflecting mirrors, a left-eye optical system 301L including multiple lenses and reflecting mirrors, and a lens system control circuit 303. The right-eye optical system 301R includes a lens 302R disposed near the object, and the left-eye optical system 301L includes a lens 302L disposed near the object. The lens 302R and the lens 302L are oriented in the same direction with the optical axes substantially parallel to each other. The right-eye optical system 301R and the left-eye optical system 301L each have a fisheye lens and form a circular optical image on the imaging unit 211. The optical image formed through the right-eye optical system 301R (right image) and the optical image formed through the left-eye optical system 301L (left image) are formed on the imaging surface of the single imaging unit 211, and the imaging unit 211 acquires one image including the image areas of the optical images.

The lens unit 300 is a dual-lens unit (VR180 lens unit) for obtaining a VR180 image which is one of VR image formats capable of binocular stereoscopic vision. In the lens unit 300, each of the right-eye optical system 301R and the left-eye optical system 301L includes a fish-eye lens capable of capturing a range of about 180 degrees. Note that the range that can be captured by the lens of each of the right-eye optical system 301R and the left-eye optical system 301L may be a range of about 160 degrees narrower than the range of 180 degrees. The lens unit 300 can form the right image formed through the right-eye optical system 301R and the left image formed through the left-eye optical system 301L on one or two imaging elements of the camera to which the lens unit 300 is attached. In the camera 100, the right image and the left image are formed on one imaging element (image sensor) to generate a single image (dual-lens image) having a right image area corresponding to the right image and a left image area corresponding to the left image in side-by-side arrangement. The dual-lens image includes the right image area, the left image area, and an area that does not correspond to the optical image (non-image area, for example, black area).

The lens unit 300 is attached to the camera 100 via a lens mount portion 304, and a camera mount portion 305 of the camera 100. The system control unit 50 of the camera 100 and the lens system control circuit 303 of the lens unit 300 are thus electrically connected to each other via the communication terminal 124 of the camera 100 and the communication terminal 306 of the lens unit 300.

In FIG. 4, the right image formed via the right-eye optical system 301R and the left image formed via the left-eye optical system 301L are formed side by side in the imaging unit 211 of the camera 100. In other words, the right-eye optical system 301R and the left-eye optical system 301L form two optical images in the two areas of one imaging element (image sensor). The imaging unit 211 converts a formed object image (optical signal) into an analog electric signal. Using the lens unit 300 (the right-eye optical system 301R and the left-eye optical system 301L) in this way, a single image (dual-lens image) including two image areas with a parallax can be acquired. By dividing the acquired image into an image for the left eye and an image for the right eye and viewing the image in VR display, the user can view a stereoscopic VR image about in a 180-degree range. In other words, the user can view a VR180 image stereoscopically.

In the case of a normal single-lens unit, an image (optical image) incident on the lens unit is inverted point-symmetrically around the optical axis of the lens unit and input to an imaging element (image sensor). An imaging apparatus such as the camera 100 can generate an image with no sense of unnaturalness (not inverted) by controlling the order in which signals are read from the imaging element or by performing inversion processing to the read signals (images). In the case of a dual-lens unit, the image is inverted vertically and input to the imaging element, but the image is not inverted left-right direction. Therefore, while the left image incident through the left-eye optical system is placed on the left side, and the right image incident through the right-eye optical system is placed on the right side, the left and right images are input to the imaging element. Therefore, if the same inversion processing as the single-lens unit is performed, the left and right side in the camera 100 and the left and right images after the inversion processing are opposite. In other words, in the generated image, the left image area corresponding to the left image is placed on the right side and the right image area corresponding to the right image is placed on the left side.

In this case, a VR image is an image capable of performing VR display to be described later. Examples of the VR image include an omnidirectional image (whole-celestial spherical image) captured by an omnidirectional camera (whole-celestial sphere camera) and a panoramic image having a video range (effective video range) larger than a display range that can be displayed at a time on the display unit. Examples of the VR image also include movie and a live image (an image obtained substantially in real time from a camera) as well as a still image. The VR image has a maximum video range (effective video range) corresponding to a field of view of 360 degrees in the left-to-right direction and 360 degrees in the up-and-down direction. Examples of the VR image also include images having an angle of view larger than an angle of view that can be captured by a typical camera or a video range larger than a display range that can be displayed at a time on the display unit, even when the video range is smaller than 360 degrees in the left-to-right direction and smaller than 360 degrees in the up-and-down direction. An image captured by the camera 100 with the lens unit 300 is a kind of VR image. The VR image can be viewed in VR display by setting, for example, the display mode of a display device (a display device capable of displaying a VR image) at "VR view". A certain range of a VR image with a 360-degree angle of view may be displayed, and the user can move the displayed range by changing the orientation of the display device in the left-to-right direction (horizontal rotation direction), so that a seamless omnidirectional image in the left-to-right direction can be viewed.

The VR display (VR view) is a display method (display mode) for displaying, from among VR images, video in a field of view corresponding to the orientation of the display device, the display method being capable of changing a display range. An example of VR display is "single-lens VR display (single-lens VR view)" in which an image is displayed after deformation (distortion correction) for mapping a VR image on a virtual sphere. Another example of the VR display is "dual-lens VR display (dual-lens VR view)" in which a left-eye VR image and a right-eye VR image are displayed in left and right areas after deformation for mapping the VR images on a virtual sphere. The "dual-lens VR display" is performed using the left-eye VR image and the right-eye VR image having a parallax, thereby achieving a stereoscopic view of the VR images. In any type of VR display, for example, when the user wears a display device such as a head-mounted display (HMD), video in the field of view range corresponding to the direction of the user's face is displayed. For example, it is assumed that from among the VR images, video is displayed in a field of view range having its center at 0 degrees (a specific cardinal point, for example, the north) in the left-to-right direction and 90 degrees (90 degrees from the zenith, that is, the horizon) in the up-and-down direction at a certain point in time. In this state, the orientation of the display device is flipped (for example, the display surface is changed from a southern direction to a northern direction), so that from among the same VR images, the display range is changed to video in a field of view range having its center at 180 degrees (an opposite cardinal point, for example, the south) in the left-to-right direction and 90 degrees in the up-and-down direction. In other words, when the face of the user with the HMD is turned from the north to the south (that is, the user turns around), video displayed on the HMD is changed from the north to the south. The VR image captured using the lens unit 300 is a VR180 image (180-degree image) that has captured the range of about 180 degrees in the front, and there is no video in the range of about 180 degrees in the rear. When such a VR180 image is displayed in VR and the orientation of the display device is changed to the side where no image exists, a blank area is displayed.

Such VR display of a VR image makes the user feel like staying in the VR image (VR space) in a visual form (sense of immersion). Note that the VR image display method is not limited to a method for changing the orientation of the display device. For example, the display range may be moved (scrolled) in response to user operation via a touch panel or directional buttons. In addition to changing the display range by changing the orientation during VR display (in the "VR View" display mode), the display range may be moved in response to the touch-move on the touch panel, dragging operation with a mouse device or the like, or pressing the directional buttons. A smartphone attached to VR goggles (head-mounted adapter) is a type of the HMD.

Configuration of VR Goggles

Figures 5A, 5B, 5C:
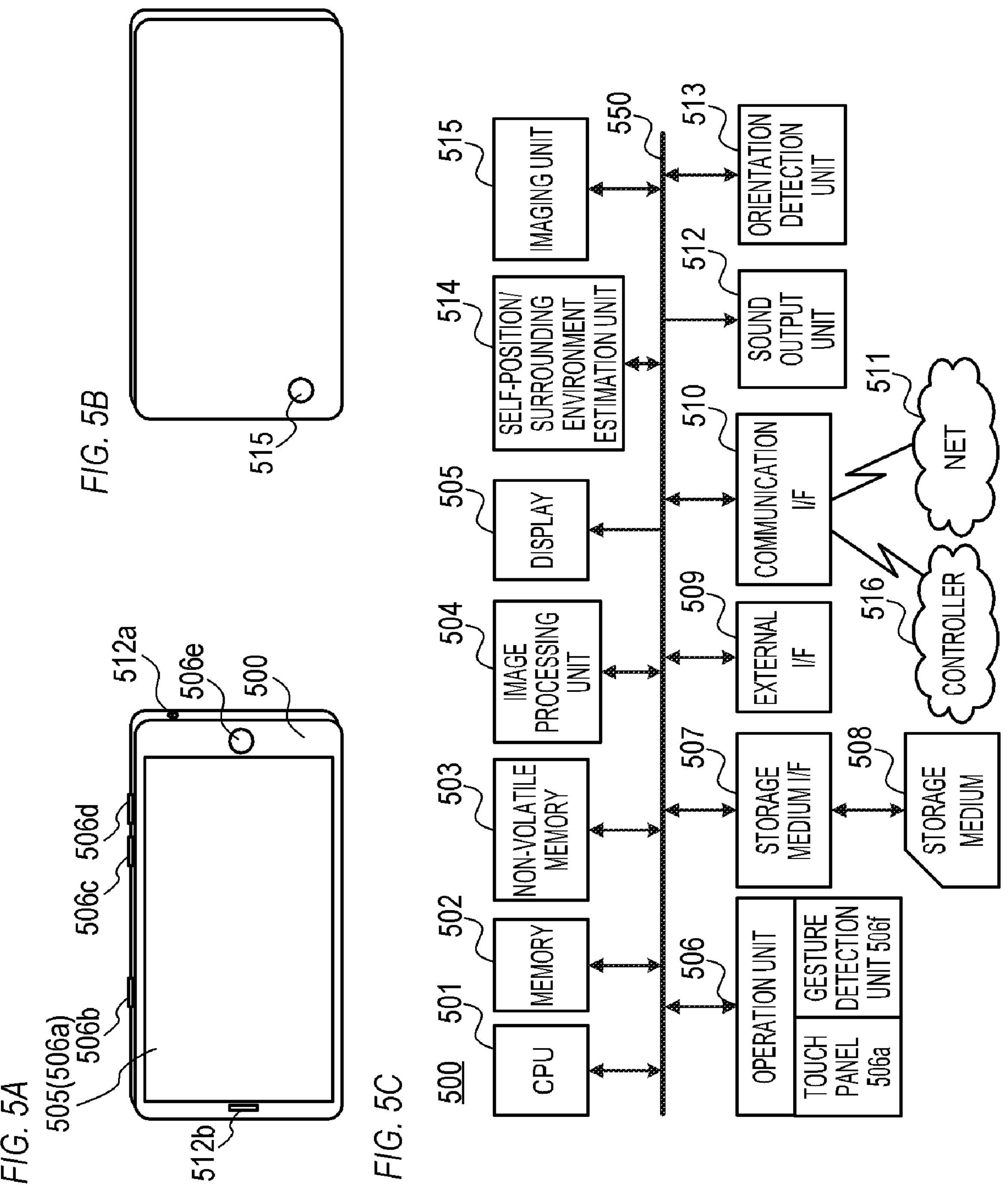
FIGS. 5A and 5B are external views of an electronic device.
FIG. 5C is a block diagram of the electronic device.

FIG. 5A is a front perspective view of an electronic device 500. The electronic device 500 is a display device, for example, a smartphone. The display 505 is a display unit that displays an image and various types of information. The display 505 is configured integrally with a touch panel 506*a*, and can detect a touch operation on a display surface of the display 505. The electronic device 500 can perform VR display of a VR image (VR content) on the display 505. An operation member 506*b* is a power button that receives an operation to switch on and off power of the electronic device 500. An operation member 506*c* and an operation member 506*d* are volume buttons for increasing or decreasing the volume of the sound output from a speaker 512*b*, an earphone connected to a sound output terminal 512*a*, or an external speaker. An operation member 506*e* is a home button for displaying a home screen on the display 505. The sound output terminal 512*a* is an earphone jack, and is a terminal that outputs an audio signal to the earphone or the external speaker. The speaker 512*b* is a built-in speaker that outputs sound.

FIG. 5B is a rear perspective view of the electronic device 500. An imaging unit 515 is a camera capable of imaging a real space.

FIG. 5C is a block diagram illustrating a configuration of the electronic device 500. A CPU 501, a memory 502, a non-volatile memory 503, an image processing unit 504, a display 505, an operation unit 506, a storage medium I/F 507, an external I/F 509, and a communication I/F 510 are connected to an internal bus 520. Furthermore, a sound output unit 512, an orientation detection unit 513, a self-position/surrounding environment estimation unit 514, and the imaging unit 515 are also connected to the internal bus 520. The units connected to the internal bus 520 can exchange data with each other via the internal bus 520.

The CPU 501 is a control unit that controls the entire electronic device 500, and includes at least one processor or circuit. The memory 502 is, for example, a RAM (volatile memory using a semiconductor element). For example, the CPU 501 controls each unit of the electronic device 500 using the memory 502 as a work memory according to a program stored in the non-volatile memory 503. The non-volatile memory 503 stores various information such as image data, audio data, other data, and various programs for operating the CPU 501. The non-volatile memory 503 is, for example, a flash memory or a ROM.

Under the control of the CPU 501, the image processing unit 504 performs various types of image processing on an image stored in the non-volatile memory 503 or a storage medium 508, a video signal acquired via the external I/F 509, or an image acquired via the communication I/F 510. The various types of image processing include A/D conversion processing, D/A conversion processing, image data encoding processing, image data compression processing, image data decoding processing, image data enlargement/reduction processing (resizing), image data noise reduction processing, and image data color conversion processing. Furthermore, the various types of image processing also include panoramic development, mapping processing, and transformation processing of a VR image that is an omni-directional image or a wide-range image having a wide range of video although not in all directions. The image processing unit 504 may be a dedicated circuit block for performing specific image processing. In addition, depending on the type of image processing, the CPU 501 can perform image processing according to a program without using the image processing unit 504.

The display 505 displays an image and a graphical user interface (GUI) screen constituting a GUI on the basis of the control of the CPU 501. The CPU 501 controls each unit of the electronic device 500 to generate a display control signal according to a program, generate a video signal to be displayed on the display 505, and output the video signal to the display 505. The display 505 displays a video on the basis of the generated and output video signal. Note that the configuration of the electronic device 500 itself may be at most an interface for outputting a video signal to be displayed on the display 505, and the display 505 may be an external monitor (for example, a television or a head mounted display).

The operation unit 506 includes various input units for receiving user operations. For example, the operation unit 506 includes a character information input device (for example, a keyboard), a pointing device (for example, a mouse or a touch panel), a button, a dial, a joystick, a touch sensor, and a touch pad. In the present embodiment, the operation unit 506 includes a touch panel 506*a*, the operation members 506*b*, 506*c*, 506*d*, and 506*e*, and a gesture detection unit 506*f*.

The storage medium 508 such as a memory card, a CD, or a DVD is attachable to and detachable from the storage medium I/F 507. The storage medium I/F 507 reads data from the attached storage medium 508 and writes data to the storage medium 508 under the control of the CPU 501. The storage medium 508 is a storage unit that stores various data including an image to be displayed on the display 505. The external I/F 509 is an interface for connecting to an external device in a wired or wireless manner and performing input/output (data communication) of a video signal and an audio signal. The communication I/F 510 is an interface for communicating (wirelessly communicating) with an external device or the Internet 511 to perform transmission and reception (data communication) of various data such as files and commands. The communication I/F 510 can also communicate (wirelessly communicate) with a controller 516.

The sound output unit 512 outputs sound of a moving image or music data reproduced by the electronic device 500, an operation sound, a ring tone, and various notification sounds. The sound output unit 512 includes the sound output terminal 512*a* to which an earphone or an external speaker is connected and a speaker 512*b*, but the sound output unit 512 may output audio data to the external speaker by wireless communication.

The orientation detection unit 513 detects the orientation (inclination) of the electronic device 500 with respect to the gravity direction or the orientation of the electronic device 500 with respect to each axis of the yaw direction, the pitch direction, and the roll direction, and notifies the CPU 501 of orientation information. On the basis of the orientation detected by the orientation detection unit 513, it is possible to determine whether the electronic device 500 is horizontally held, vertically held, directed upward, directed downward, or in an oblique attitude. In addition, it is possible to determine presence or absence and magnitude of inclination of the electronic device 500 in the rotation direction such as the yaw direction, the pitch direction, and the roll direction, and whether the electronic device 500 has rotated in the rotation direction. One of an acceleration sensor, a gyro sensor, a geomagnetic sensor, an orientation sensor, and an altitude sensor, or a combination of a plurality of sensors can be used as the orientation detection unit 513.

The self-position/surrounding environment estimation unit 514 estimates the self-position of the electronic device 500 or the VR goggles 530 and the surrounding environment.

The self-position is a position of the electronic device 500 or the VR goggles 530 in a space of a predetermined range. For example, the self-position is expressed by three parameters representing positions in a coordinate system defined by three axes of an X axis, a Y axis, and a Z axis orthogonal to each other at a predetermined position in a space of a predetermined range so that the predetermined position becomes an origin. The self-position may be expressed by further using three parameters representing the orientation (direction).

The surrounding environment includes an obstacle region. The obstacle region is a region of an object that is an obstacle for the user carrying the electronic device 500 or the user wearing the VR goggles 530 among objects existing around the electronic device 500 or the VR goggles 530. For example, the obstacle region is expressed by a plurality of sets of three parameters representing positions in a coordinate system defined by three axes of an X axis, a Y axis, and a Z axis orthogonal to each other at a predetermined position in a space of a predetermined range so that the predetermined position becomes an origin.

An imaging unit 515 is a camera capable of imaging a real space. The image obtained by capturing the real space can be used for various detection processing, and is used by, for example, the gesture detection unit 506*f* and the self-position/surrounding environment estimation unit 514. Furthermore, an image obtained by imaging the real space can be displayed on the display 505.

As described above, the operation unit 506 includes the touch panel 506*a*. The touch panel 506*a* is an input device configured to be superimposed on the display 505 in a planar manner and output coordinate information corresponding to a position being touched. For the touch panel 506*a*, the CPU 501 can detect the following operations or states:

An operation body (for example, a finger or a pen) that is not in contact with the touch panel 506*a* newly touches the touch panel 506*a*, that is, a start of a touch (hereinafter referred to as touch-down).

A state in which the operation body is in contact with the touch panel 506*a* (hereinafter referred to as touch-on).

An operation body moving in contact with the touch panel 506*a* (hereinafter referred to as touch-move)

An operation in which an operation body that is in contact with the touch panel 506*a* is separated from the touch panel 506*a*, that is, an end of the touch (hereinafter referred to as touch-up).

A state in which nothing is in contact with the touch panel 506*a* (hereinafter referred to as touch-off).

When the touch-down is detected, the touch-on is detected at the same time. After the touch-down, the touch-on is continuously detected unless the touch-up is detected. Also, when the touch-move is detected, the touch-on is detected at the same time. Even if the touch-on is detected, the touch-move is undetected as long as the touch position is not moved. After the touch-up of all the operation bodies having been in contact with the touch panel is detected, the touch-off is established.

These operations and states and the position coordinates of the operation body that is in contact with the touch panel 506*a* are notified to the CPU 501 through an internal bus. The CPU 501 determines what kind of operation (touch operation) is performed on the touch panel 506*a*, based on the notified information. With regard to the touch-move, a movement direction of the operation body moving on the touch panel 506*a* can be determined for each vertical component and for each horizontal component on the touch panel 506*a*, based on change of the position coordinates. When the touch-move for a predetermined distance or more is detected, it is determined that a sliding operation has been performed.

An operation in which an operation body is swiftly moved by a certain distance while being in contact with the touch panel 506*a* and is separated is called a flick. In other words, the flick is an operation in which the operation body is swiftly slid on the touch panel 506*a* so as to flick the touch panel 506*a*. When the touch-move at a predetermined speed or higher for a predetermined distance or more is detected and then the touch-up is detected, it can be determined that a flick has been performed (it can be determined that a flick has been performed subsequently to a sliding operation).

Further, a touch operation in which a plurality of locations (e.g., two locations) are touched at the same time and touch positions are brought close to each other is referred to as a pinch-in, and a touch operation in which the touch positions are moved away from each other is referred to as a pinch-out. To pinch out and to pinch are collectively called a pinching operation (or simply referred to as a pinch). A method of the touch panel 506*a* may be any of various methods including resistive, capacitive, surface acoustic wave, infrared, electromagnetic induction, image recognition, and optical sensor methods. There are a method of detecting a touch based on contact with a touch panel, and a method of detecting a touch based on approach of an operation body to the touch panel, but any method may be adopted.

As described above, the operation unit 506 includes the gesture detection unit 506*f*. The gesture detection unit 506*f* detects the gesture of the user (for example, the hand of the user) from the image obtained by the imaging unit 515 (the image obtained by capturing the real space) on the basis of the control of the CPU 501. The CPU 501 performs various types of processing (control) according to the detected gesture.

Figure 5D:
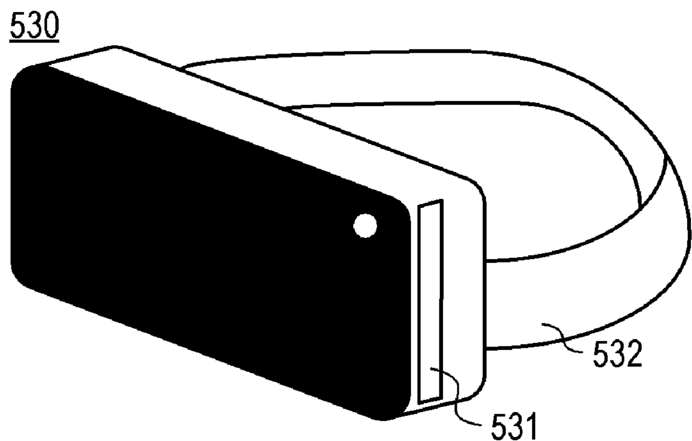
FIG. 5D is an external view of VR goggles.

FIG. 5D is an external view of the VR goggles (head mounted adapter) 530 to which the electronic device 500 can be attached. The electronic device 500 can also be used as a head-mounted display by being attached to the VR goggles 530. An insertion port 531 is an insertion port into which electronic device 500 is inserted. The entire electronic device 500 can be inserted into the VR goggles 530 with the display surface of the display 505 facing a headband 532 side (that is, the user side) for fixing the VR goggles 530 to the user's head. The user can visually recognize the display 505 without holding the electronic device 500 with his/her hand while wearing the VR goggles 530 to which the electronic device 500 is attached on the head. In this case, when the user moves the head or the entire body, the orientation of the electronic device 500 also changes. The orientation detection unit 513 detects a change in the orientation of the electronic device 500 at this time, and the CPU 501 performs processing for VR display (display in the display mode "VR view") on the basis of the change in the orientation. In this case, detecting the orientation of the electronic device 500 by the orientation detection unit 513 is equivalent to detecting the orientation of the head of the user (the direction in which the line of sight of the user is directed). The VR display (VR view) is a display method (display mode) for displaying, from among VR images, video in a field of view corresponding to the orientation of the display device, the display method being capable of changing a display range.

Note that the electronic device 500 itself may be a head mounted display that can be attached on the head even without VR goggles. The electronic device 500 may be capable of detecting a gaze or facial expression of the user, and the user may be able to operate the electronic device 500 with the gaze or facial expression.

Figure 5E:
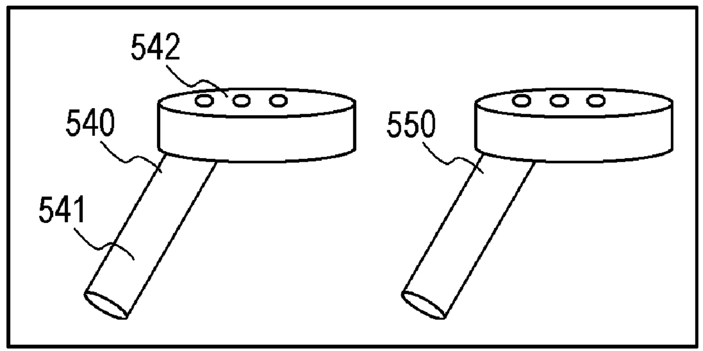
FIGS. 5E and 5F are external views of a controller.

FIG. 5E is an external view of controller 516 that is an example of controllers 540 and 550 that can communicate with the electronic device 500. The controller 540 is a grip type controller operated by the user with the left hand. The user grips a hold portion 541 of the controller 540 with the left hand, and operates operation members arranged on an operation surface 542 with a finger (for example, a thumb) of the left hand. The controller 540 notifies the electronic device 500 of an operation performed by the user. The controller 550 is a grip type controller operated by the user with the right hand, and has the same configuration as the controller 540 (for example, a form in which the controller 540 is horizontally inverted).

Figure 5F:
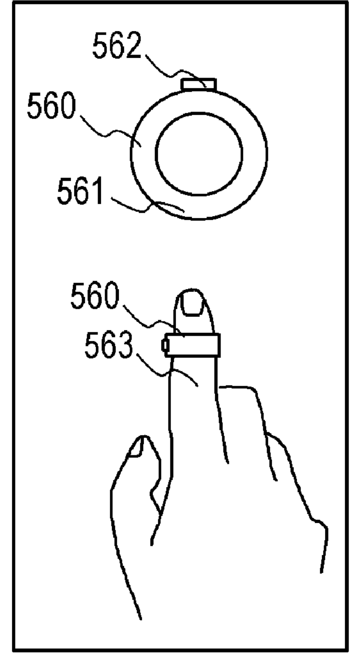

As the controller 516, a controller 560 illustrated in FIG. 5F may be used. The controller 560 is a ring-shaped controller that is operated by being worn on a finger of a user. The controller 560 includes a ring portion 561 to be worn on user's finger 563 and an operation member 562. The operation member 562 is, for example, a push button, a rotary dial, or an optical track pad. The optical track pad is a type of operation member capable of detecting contact or approach of a finger.

In the following description, it is assumed that the user wears the VR goggles 530 on which the electronic device 500 is attached.

Processing of Camera for VR Live View

Figure 6:
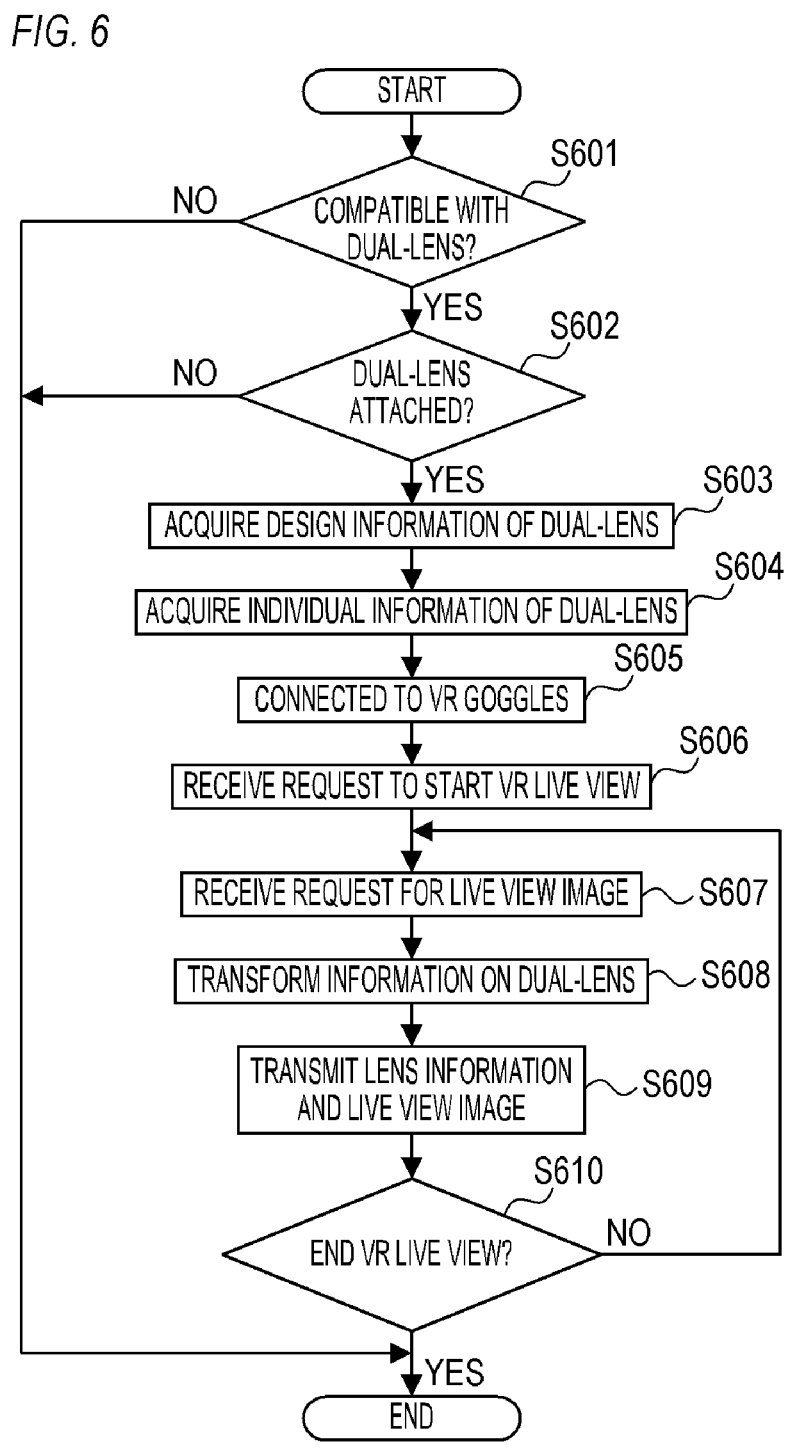

FIG. 6 is a flowchart illustrating an example of processing of the camera 100 for a VR live view. The processing in FIG. 6 is implemented by loading a program recorded in the non-volatile memory 219 into the system memory 218 and executing the program by the system control unit 50. For example, when the camera 100 is started, the processing of FIG. 6 is started.

In step S601, the system control unit 50 determines whether the camera 100 is compatible with a dual-lens unit (such as the lens unit 300). For example, the system control unit 50 determines whether the version of the firmware of the system control unit 50 is compatible with the dual-lens unit. If the system control unit 50 determines that the version is compatible with the dual-lens unit, the system control unit 50 proceeds the process to step S602, and if not, ends the process of FIG. 6.

In step S602, the system control unit 50 determines whether the dual-lens unit is attached to the camera 100. If the system control unit 50 determines that the dual-lens unit is attached, the system control unit 50 proceeds the process to step S603, and if not, ends the processing of FIG. 6.

In step S603, the system control unit 50 acquires design information of the dual-lens unit (lens design information) from the dual-lens unit attached (connected) thereto. The lens design information includes design parameters, and is used for image processing such as left-right switching processing and equidistant cylinder transformation processing to be described later.

For example, the lens design information includes the following information.

1. Image circle position
2. Image circle diameter
3. Angle of view
4. Distortion correction coefficient The image circle position corresponds to the coordinates of the optical axis center of the optical system in the image to be captured (an image including a right image area and a left image area), and is provided for each of the two optical systems of the dual-lens unit (the left-eye optical system 301L and the right-eye optical system 301R). In other words, the image circle position is the center coordinate of an image circle (circular fish-eye image) formed on the imaging element. The image circle position is prepared for each of the right image and the left image. The origin point of coordinates is, for example, the center of the imaging element (the center of an image to be captured). The image circle position includes a coordinate in the horizontal direction and a coordinate in the vertical direction. The image circle position may be used from a variety of information on the center of the optical axis of the optical system in an image to be captured. For example, the image circle position may be a distance from a predetermined position (the center or an upper-left corner) in an image to be captured to the center of the optical axis.

The image circle diameter is the diameter of an image circle (circular fish-eye image) formed on the imaging element. The angle of view is an angle of view of an image circle (circular fish-eye image) formed on the imaging element. The distortion correction coefficient is the ratio of a design image height to the ideal image height of the lens. A distortion correction coefficient may be set for each image height, and for an image height for which a distortion correction coefficient is not set, a distortion correction coefficient may be calculated by interpolation in which a plurality of distortion correction coefficients are used. An approximate polynomial may be set for the relationship between an image height and a distortion correction coefficient. The image circle diameter, the angle of view, and the distortion correction coefficient may be or do not necessarily need to be common parameters for the two optical systems of the dual-lens unit (the left-eye optical system 301L and the right-eye optical system 301R).

In step S604, the system control unit 50 acquires individual information of the dual-lens unit (lens individual information) from the dual-lens unit attached (connected) thereto. The lens individual information includes a parameter specific for a lens unit, for example, an error during manufacturing. Using the lens individual information enables image processing with higher accuracy than the use of only the lens design information.

For example, the lens individual information includes the following information. The following information are prepared by carrying out measurement about each of the two optical systems of the dual-lens unit (the left-eye optical system 301L and the right-eye optical system 301R).

5. Image circle displacement
6. Optical axis inclination
7. Image magnification deviation The image circle displacement is a deviation of the center coordinate of an image circle (circular fish-eye image), which is formed on the imaging element, from the design value. For example, the image circle displacement includes a deviation in the horizontal direction and a deviation in the vertical direction. A deviation in the horizontal direction is indicated by coordinates in the horizontal direction, and a deviation in the vertical direction is indicated by coordinates in the vertical direction with the origin point located at the coordinates of a design value (design information) (two-dimensional coordinates including coordinates in the horizontal direction and coordinates in the vertical direction). The optical axis inclination is a deviation from the design value in the direction of the optical axis near an object. For example, the optical axis inclination includes a deviation in the horizontal direction and a deviation in the vertical direction. A deviation in each direction is indicated by an angle. The image magnification deviation is a deviation of the size of an image circle (circular fish-eye image), which is formed on the imaging element, from the design value. The deviation is indicated by, for example, a ratio to the design value.

In step S605, the camera 100 is connected to the VR goggles 530 (electronic device 500), and the system control unit 50 detects the connection of the camera 100 to the VR goggles 530. In step S606, the system control unit 50 receives, from the VR goggles 530, a request to start VR live view. In step S607, the system control unit 50 receives, from the VR goggles 530, a request for a live view image.

In step S608, the system control unit 50 transforms the information obtained in steps S603 and S604 (lens information on the dual-lens unit), according to the coordinate system of the live view image to be transmitted. In a case where the information acquired in steps S603 and S604 is determined based on a coordinate system different from the coordinate system of the live view image, the information acquired in steps S603 and S604 cannot be used as is for image processing of the live view image. Therefore, the lens information is transformed into information suitable for the coordinate system of the live view image.

Information included in the lens information is not limited to the foregoing information. For example, the lens information may include the boundary positions of the right image area and the left image area in an image to be captured (the positions of the edges of the circular fish-eye image). The lens information may include the midpoint coordinates between the right image area and the left image area in the image to be captured. In many cases, the midpoint coordinates coincide with the center coordinates of the image to be captured. The lens information may include information indicating the area of the magic window that is an area to be cut out (first) for VR display (such as the coordinates of the upper left corner of the magic window area, the width of the magic window area, and the height of the magic window area). The lens information may include correction data (such as correction values acquired by calibrating the dual-lens unit) to improve the accuracy of left-right switching processing and equidistant cylinder transformation processing.

In step S609, the system control unit 50 transmits, to the VR goggles 530, the lens information transformed in step S608 and the live view image. Here, the live view image is the above-described dual-lens image. In the present embodiment, the system control unit 50 of the camera 100 performs the lens information transformation processing, however, the CPU 501 of the VR goggles 530 may perform the lens information transformation processing. At that time, the system control unit 50 transmits the lens information before the transformation and parameters necessary for the lens information transformation processing to the VR goggles 530.

In step S610, the system control unit 50 determines whether or not to end the VR live view. For example, if the camera 100 and the VR goggles 530 are disconnected from each other or the user instructs the camera 100 or the VR goggles 530 to end VR live view, it is determined that the VR live view is to be ended. In a case where it is determined that the VR live view is ended, the system control unit 50 ends the process of FIG. 6, and otherwise, proceeds the process to step S607.

Processing of VR Goggles for VR Live View

Figure 7:
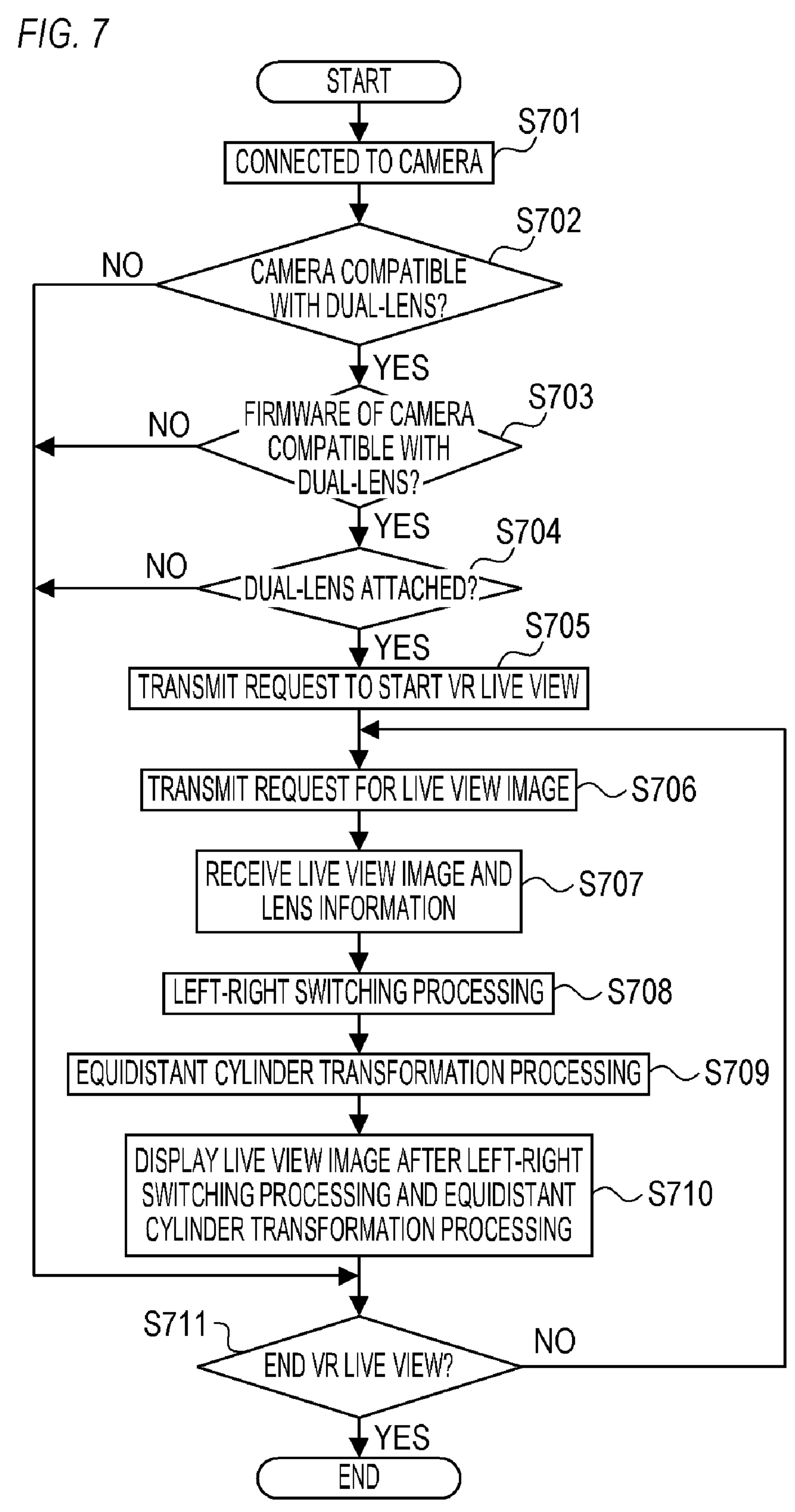
FIG. 7 is a flowchart indicating processing of the VR goggles.

FIG. 7 is a flowchart illustrating an example of processing of the VR goggles 530 (electronic device 500) for a VR live view. The processing of FIG. 7 is implemented by loading programs (application programs), which are recorded in the non-volatile memory 503, in the memory 502 by the CPU 501. For example, when the user instructs the VR goggles 530 to start a specific application, the processing of FIG. 7 starts.

In step S701, a camera (e.g., the camera 100) is connected to the VR goggles 530, and the CPU 501 detects the connection of the camera to the VR goggles 530.

In step S702, the CPU 501 determines whether the camera connected in step S701 is compatible with the dual-lens unit (e.g., the lens unit 300). For example, the CPU 501 acquires model information on the camera from the connected camera and determines whether the camera is compatible with the dual-lens unit based on the acquired model information. If the CPU 501 determines that the camera is compatible with the dual-lens unit, the CPU 501 proceeds the process to step S703, and if not, ends the process of FIG. 7. The camera compatible with the dual-lens unit is, for example, a camera to which a dual-lens unit can be attached.

In step S703, the CPU 501 determines whether the firmware of the camera connected in step S701 is compatible with the dual-lens unit. For example, the CPU 501 acquires version information on the firmware of the camera from the connected camera and determines whether the version of the firmware of the connected camera is compatible with the dual-lens unit based on the acquired information. If the CPU 501 determines that the version is compatible with the dual-lens unit, the CPU 501 proceeds the process to step S704, and if not, ends the process of FIG. 7.

Even if the camera compatible with the dual-lens unit is connected to the VR goggles 530, the connected camera may become incompatible with the dual-lens unit because of an old firmware version of the connected camera. Thus, the processing of step S703 is necessary. Since various cameras are connectable to the VR goggles 530, cameras incompatible with the dual-lens unit may be connected to the VR goggles 530 regardless of the version of the firmware. Thus, the processing of step S702 is necessary before the processing of step S703.

In step S704, the CPU 501 determines whether the dual-lens unit have been attached to the camera connected in step S701. If the CPU 501 determines that the dual-lens unit is attached, the CPU 501 proceeds the process to step S705, and if not, ends the process of FIG. 7.

In step S705, the CPU 501 transmits a request to start VR live view to the camera connected in step S701.

In step S706, the CPU 501 transmits a request for a live view image to the camera connected in step S701.

In step S707, the CPU 501 receives, from the camera connected in step S701, a live view image captured by the camera and lens information on the dual-lens unit attached to the camera. The lens information received in step S708 is information transformed according to the received live view image (for example, the lens information transformed in step S608 of FIG. 6). The live view image and the lens information received in step S707 are, for example, the live view image and the lens information transmitted from the camera 100 in step S609.

In step S708, the CPU 501 performs left-right switching processing of exchanging the positions of the right image area and the left image area in the live view image acquired in step S707 on the basis of the lens information acquired in step S707. Based on center coordinates (the centers of the optical axes of the left-eye optical system 301L and the right-eye optical system 301R) included in the lens information received with the live view image, the CPU 501 exchanges the positions of the right image area and the left image area in the live view image. For example, the CPU 501 specifies the right image area based on the center coordinates of the right image area, and specifies the left image area based on the center coordinates of the left image area. Then, the CPU 501 replaces the positions of the specified right image area and left image area. In the present embodiment, a right image area and a left image area are horizontally placed next to each other in a live view image (captured image), and by the left-right switching processing, the positional relationship between the right image area and the left image area is horizontally inverted. The diameters (diameter or radius) of the right image area and the left image area may be acquired and used from lens information of the dual-lens unit in order to specify the right image area and the left image area with higher accuracy.

Figure 8A:
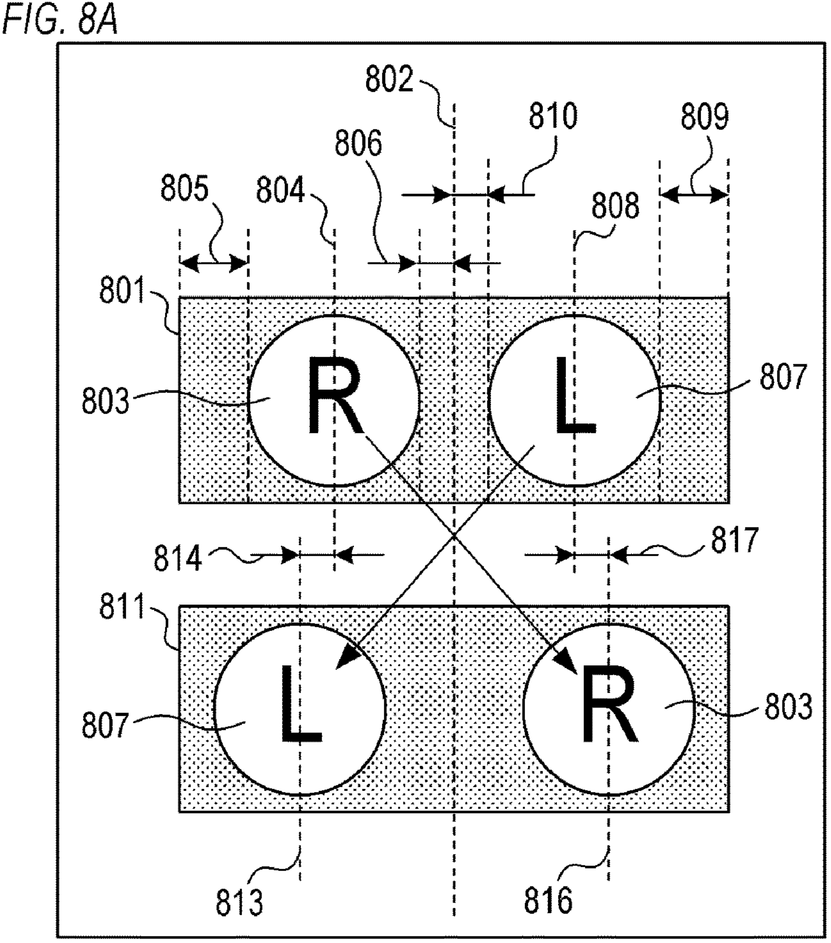
FIGS. 8A and 8B are schematic views indicating left-right switching processing.

A method for the left-right switching processing is not limited to the foregoing method. For example, displacements 805, 806, 809, and 810 in FIG. 8A are acquired from the lens information of the dual-lens unit. In switching the positions of the right image area 803 and the left image area 807, the right image area and the left image area may be arranged such that the acquired displacement is maintained, and the remaining area may be filled with black or the like. The displacement 805 is a distance from the left end of a live view image to the left end of the right image area 803, and the displacement 806 is a distance from the center of the live view image to the right end of the right image area 803. In the left-right switching processing, the displacement 805 is a distance from the left end of the live view image to the left end of the left image area, and the displacement 806 is a distance from the center of the live view image to the right end of the left image area. Likewise, the displacement 809 is a distance from the right end of the live view image to the right end of the left image area 807, and the displacement 810 is a distance from the center of the live view image to the left end of the left image area 807. In the left-right switching processing, the displacement 809 is a distance from the right end of the live view image to the right end of the right image area, and the displacement 810 is a distance from the center of the live view image to the left end of the right image area.

In step S709, the CPU 501 performs equidistant cylinder transformation processing of transforming each of the right image area and the left image area from the circular fish-eye image area (the area of the circular fish-eye image) to the equidistant cylindrical image area (the area of the equidistant cylindrical image) on the image after the left-right switching processing in step S708. The equidistant cylinder transformation processing is transformation in which a circular fish-eye image assumed to be a sphere has latitude lines (horizontal lines) and longitude lines (vertical lines) crossing each other at right angles as in equidistant cylindrical projection for a map. Through the equidistant cylinder transformation processing, the circular fish-eye image area is transformed into an equidistant cylindrical image area shaped like a rectangle. The CPU 501 adjusts the lens design information acquired in step S707 based on the lens individual information acquired in step S707. For example, image circle positions (the center coordinates of the right image area and the left image area in the live view image) are adjusted based on an image circle displacement. When the lens individual information indicates a difference from the lens design information, the value of the lens individual information is added to the value of the lens design information. When the lens individual information indicates an absolute value similar to that of the lens design information, the value of the lens design information is replaced with the value of the lens individual information. Based on the adjusted center coordinates (the centers of the optical axes of the left-eye optical system 301L and the right-eye optical system 301R), the CPU 501 generates a map for the equidistant cylinder transformation. The map indicates positions in the image before the transformation, the positions corresponding to pixels after the transformation. The map for the equidistant cylinder transformation is generated so that the circular fish-eye image area can be transformed into an equidistant cylindrical image area and the positions of the right image area and the left image area can be corrected (adjusted). Using the adjusted center coordinates enables the equidistant cylinder transformation with higher accuracy. As described above, the CPU 501 may correct (adjust) the lens design information by using the lens individual information included in the lens information received together with the live view image, generate a map on the basis of the corrected lens design information, and perform the equidistant cylinder transformation processing on the basis of the map.

Note that the order of the left-right switching processing in step S708 and the equidistant cylinder transformation processing in step S709 may be replaced. The left-right switching processing and the equidistant cylinder transformation processing do not necessarily need to be individually performed, and may be collectively performed as one image processing.

In step S710, the CPU 501 displays, on the display 505, a part of the live view image (display image, image for displaying) after the left-right switching processing in step S708 and the equidistant cylinder transformation processing in step S709 are performed (VR display). Note that, in step S710, the CPU 501 may further execute the perspective projection transformation processing on a part of the live view image with the equidistant cylinder transformation processing, and display the part on the display 505. Alternatively, the CPU 501 may perform the perspective projection transformation processing on a part of the circular fish-eye image area of each of the right image area and the left image area of the live view image in step S710 without performing the equidistant cylinder transformation processing in step S709, and display the part on the display 505. In the present embodiment, the processing in step S710 is performed in a case where the dual-lens unit is attached to the camera connected in step S701, and is not performed in a case where the dual-lens unit is not attached to the camera connected in step S701.

In step S711, the CPU 501 determines whether or not to end the VR live view. In a case where it is determined that the VR live view is ended, the CPU 501 ends the processing of FIG. 7, and if not, proceeds the process to step S706.

Left-Right Switching Processing

Figure 8B:
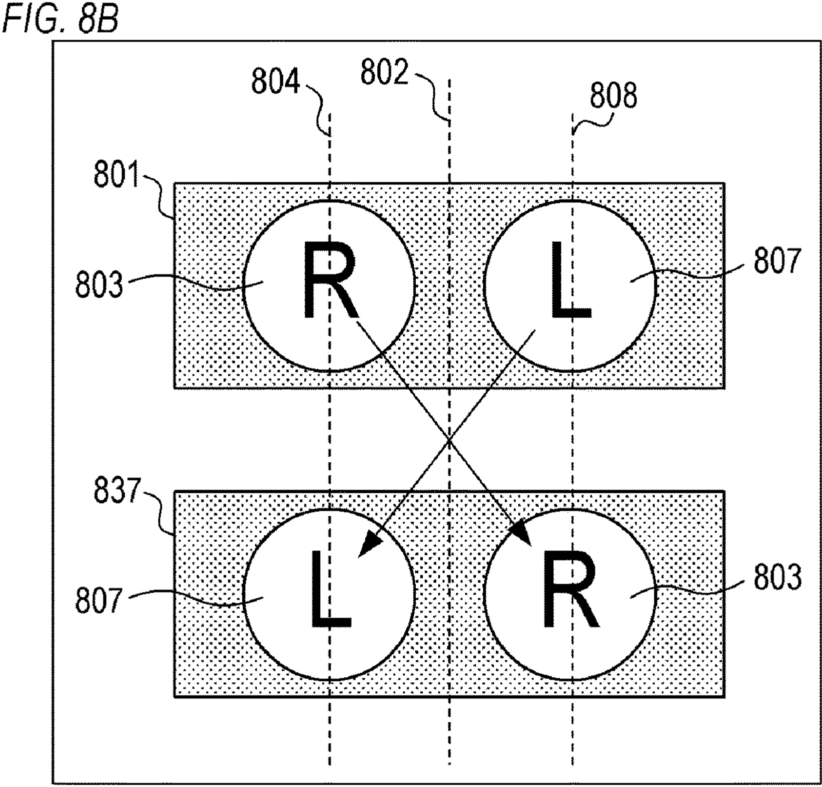

FIGS. 8A and 8B are schematic views indicating left-right switching processing; FIG. 8A illustrates a left-right switching processing without using the lens information of the dual-lens unit. FIG. 8B illustrates a left-right switching processing using the lens information of the dual-lens unit.

As shown in FIGS. 8A and 8B, in the image 801 before left-right switching processing, the right image area 803, which is the area of the circular fish-eye image, is located on the left side, and the left image area 807, which is the area of the circular fish-eye image, is on the right side.

In FIG. 8A, the image 801 is divided into the left half image area and the right half image area along the center coordinates 802 of the image 801, and the left half image area and the right half image area are switched. In other words, the left half image area is moved to the right side of the right half image area. The image 811 is the image acquired as the result of such left-right switching processing.

In FIG. 8A, the displacement 806 is smaller than the displacement 805. In other words, in the image 801, the right image area 803 is shifted to the center of image 801 from the center of the left half of image 801. Likewise, the displacement 810 is smaller than the displacement 809. In other words, in image 801, the left image area 807 is shifted to the center of image 801 from the center of the right half of image 801. Therefore, in image 811, the center coordinates 813 of the left image area 807 in the left-to-right direction are shifted by a distance 814 from the center coordinates 804 (the center coordinates of the right image area 803 before the left-right switching processing). Similarly, the center coordinates 816 of the right image area 803 in the left-to-right direction are shifted by a distance 817 from the center coordinates 808 (the center coordinates of the left image area 807 before the left-right switching processing).

By using the lens information, the center of the left image area in the left-to-right direction can be aligned with the center coordinate 804, and the center of the right image area in the left-to-right direction can be aligned with the center coordinate 808 in an image 837 after the left-right switching processing (FIG. 8B).

Processing of Camera for Camera Setting During VR Live View

Figure 9:
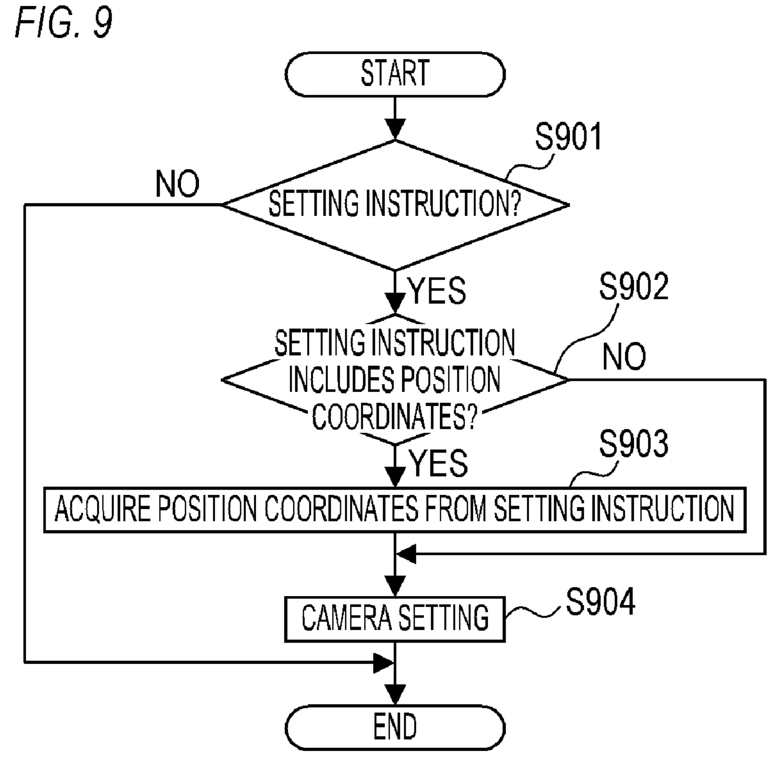
FIG. 9 is a flowchart indicating the processing of the camera.

FIG. 9 is a flowchart illustrating an example of processing of the camera 100 for performing a camera setting (setting (setting change) for the camera 100) during VR live view. The processing in FIG. 9 is implemented by loading a program recorded in the non-volatile memory 219 into the system memory 218 and executing the program by the system control unit 50. For example, the processing of FIG. 9 starts after the processing of FIG. 6.

In step S901, the system control unit 50 determines whether or not a setting instruction (setting change instruction) for the digital camera 100 has been received from the VR goggles 530. If the system control unit 50 determines that the setting instruction is received, the system control unit 50 proceeds the process to step S902, and if not, ends the process of FIG. 9.

In step S902, the system control unit 50 determines whether or not the setting instruction received in step S901 includes position coordinates. If the system control unit 50 determines that the setting instruction includes the position coordinates, the system control unit 50 proceeds the process to step S903, and if not, proceed the process to step S904.

In step S903, the system control unit 50 acquires the position coordinates from the setting instruction received in step S901.

In step S904, the system control unit 50 performs the setting (setting change) of the camera 100 according to the setting instruction received in step S901. When acquiring the position coordinates in step S903, the system control unit 50 performs a setting for the camera 100 based on the position coordinates. A camera setting based on the position coordinates is, for example, setting of a focus position (focus target position), setting of a reference position of white balance, and the like.

Processing of VR Goggles for Camera Setting During VR Live View

Figure 10:
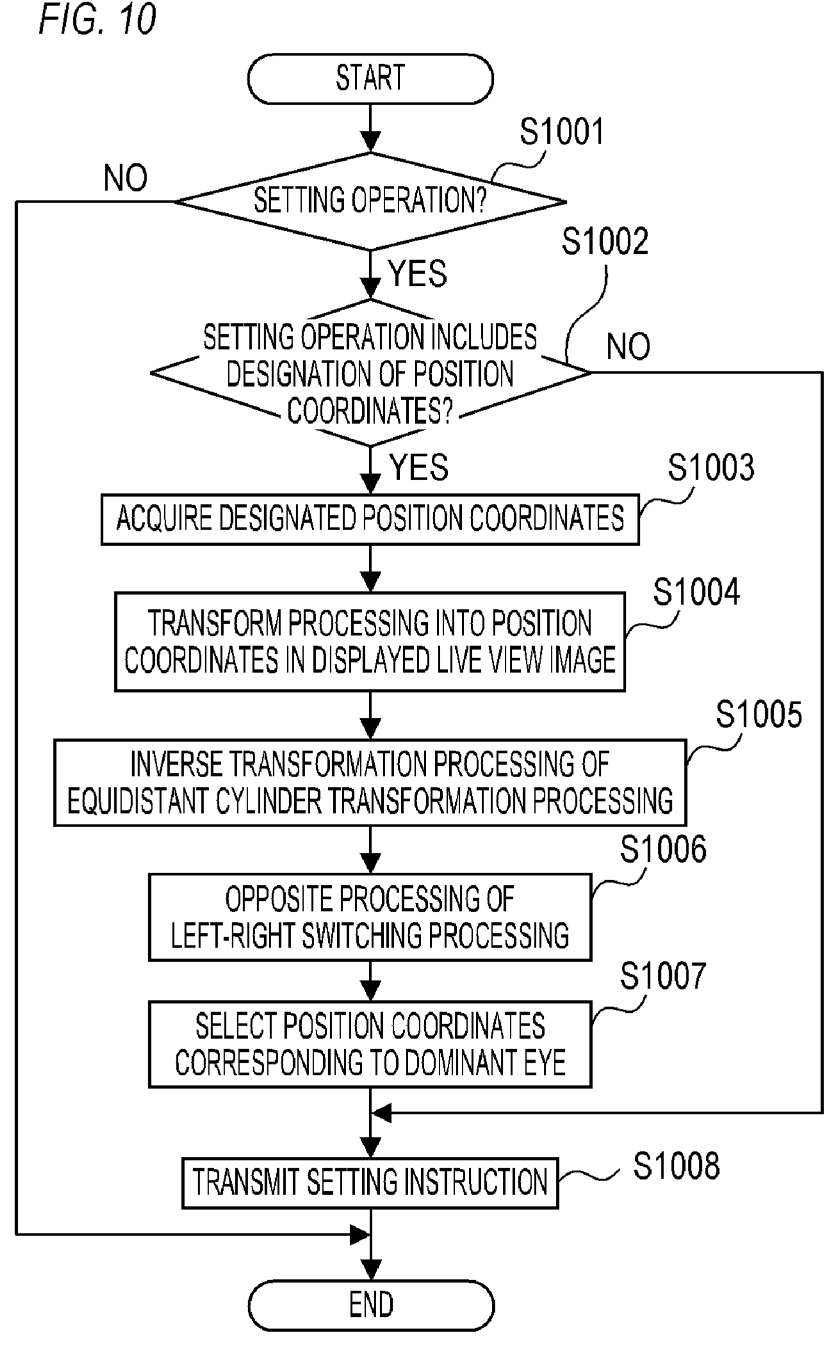
FIG. 10 is a flowchart indicating the processing of the VR goggles.

FIG. 10 is a flowchart illustrating an example of processing of the VR goggles 530 (electronic device 500) for a camera setting during a VR live view. The processing of FIG. 10 is implemented by loading programs (application programs), which are recorded in the non-volatile memory 503, in the memory 502 by the CPU 501. For example, the processing of FIG. 10 starts after the processing of FIG. 7.

In step S1001, the CPU 501 determines whether or not a user operation (setting operation and setting change operation) for a camera setting has been performed on the VR goggles 530. If the CPU 501 determines that the setting operation is performed, the CPU 501 proceeds the process to step S1002, and if not, ends the process of FIG. 10.

In step S1002, the CPU 501 determines whether or not the setting operation in step S1001 includes designation of position coordinates. If the CPU 501 determines that the setting operation includes the designation of position coordinates, the CPU 501 proceeds the process to step S1003, and if not, proceed the process to step S1008.

In step S1003, the CPU 501 acquires position coordinates designated by the user. The user designates position coordinates in a part (display range) of the live view image displayed on the display 505. In step S1003, position coordinates in the coordinate system of the display range may be obtained. In the present embodiment, it is assumed that dual-lens VR display is performed so that a part of the live view image displayed on the display 505 is stereoscopically viewed, and the user designates three-dimensional position coordinates in a three-dimensional space of the live view image being stereoscopically viewed. Then, in step S1003, it is assumed that three-dimensional position coordinates in a three-dimensional coordinate system (world coordinate system) representing a three-dimensional space are obtained. Here, the live view image displayed on the display 505 is a live view image after the left-right switching processing and the equidistant cylinder transformation processing are performed.

In step S1004, the CPU 501 transforms the position coordinates acquired in step S1003 into position coordinates in (the entire) live view image displayed on the display 505. As described above, the live view image displayed on the display 505 is a live view image after the left-right switching processing and the equidistant cylinder transformation processing are performed. In the present embodiment, in step S1003, three-dimensional position coordinates in a three-dimensional space of the live view image viewed stereoscopically are designated. Then, in step S1004, two position coordinates (position coordinates in the right image area that is an equidistant cylindrical image area, and position coordinates in the left image area that is an equidistant cylindrical image area) corresponding to two equidistant cylindrical image areas respectively are obtained from one three-dimensional coordinate.

The captured image obtained by the imaging unit of the camera (for example, the imaging unit 211 of the camera 100) connected to the VR goggles 530 is an image before the transformation processing such as the left-right switching processing and the equidistant cylinder transformation processing is performed. Therefore, the position coordinates in the live view image after such transformation processing cannot be used for the camera setting as they are. Therefore, in the present embodiment, a conversion processing opposite to the conversion processing such as the left-right switching processing and the equidistant cylinder transformation processing is performed on the position coordinates acquired in step S1004.

In step S1005, the CPU 501 performs an inverse transformation processing of the equidistant cylinder transformation processing to transform the position coordinates (position coordinates in the equidistant cylindrical image area) acquired in step S1004 into position coordinates in the circular fish-eye image.

When the perspective projection transformation processing is also performed in step S710, the CPU 501 further performs the inverse transformation processing of the perspective projection transformation processing in step S1005, and then performs the inverse transformation processing of the equidistant cylinder transformation processing. Alternatively, in a case where the equidistant cylinder transformation processing is not performed in step S709 and the perspective projection transformation processing is performed in step S710, the CPU 501 transforms the position coordinates (position coordinates in the perspective projection image area) acquired in step S1004 into position coordinates in the circular fish-eye image by performing inverse transformation of the perspective projection transformation processing in step S1005.

In step S1006, the CPU 501 performs opposite processing (inverse transformation processing) of the left-right switching processing on the position coordinates acquired in step S1005. As a result, position coordinates in the live view image before the left-right switching processing and the equidistant cylinder transformation processing are performed are obtained. In the present embodiment, two position coordinates (position coordinates in the right image area that is a circular fish-eye image area, and position coordinates in the left image area that is a circular fish-eye image area) corresponding to two circular fish-eye image areas respectively are obtained.

The inverse transformation processing in steps S1005 and S1006 is performed on the basis of the lens information received together with the live view image, for example, similarly to the left-right switching processing and the equidistant cylinder transformation processing. When the dual-lens unit attached to the camera connected to the VR goggles 530 is changed to another dual-lens unit, lens information of the dual-lens unit after the change is obtained, and various types of processing are performed using the lens information. The order of the inverse transformation processing in step S1005 and the inverse transformation processing in step S1006 may be switched. A plurality of inverse transformation processing does not necessarily need to be individually performed, and may be collectively performed as one image processing.

In step S1007, the CPU 501 selects the position coordinates in the image area on the predetermined side from the position coordinates in the right image area that is the circular fish-eye image area and the position coordinates in the left image area that is the circular fish-eye image area. For example, a dominant eye of the user is preset, and position coordinates in an image area corresponding to the dominant eye are selected. When the dominant eye is the right eye, the position coordinates in the right image area are selected, and when the dominant eye is the left eye, the position coordinates in the left image area are selected.

Note that, for example, in the case of single-lens VR display based on only one of the right image area and the left image area, one position coordinate is obtained in step S1006 with respect to one position coordinate designated by the user. Therefore, in such a case, the processing of step S1007 may be omitted. Furthermore, the processing of step S1007 (selection of position coordinates) may be performed after step S1004, or the inverse transformation processing of steps S1005 and S1006 may be performed on the selected position coordinates.

In step S1008, the CPU 501 transmits a setting instruction according to the setting operation of step S1001 to the camera connected to the VR goggles 530. In a case where the setting operation of step S1001 includes designation of the position coordinates, the CPU 501 includes the position coordinates after performing the inverse transformation processing in steps S1005 and S1006 (the position coordinates selected in step S1007) in the setting instruction. In the camera connected to the VR goggles 530, a camera setting is performed according to the setting instruction (step S904 in FIG. 9). Therefore, the processing of step S1008 can also be regarded as control for performing the camera setting. Note that, in the present embodiment, the CPU 501 of the VR goggles 530 performs the conversion processing of the position coordinates (conversion processing opposite to the conversion processing such as the left-right switching processing and the equidistant cylinder transformation processing), but the system control unit 50 of the camera 100 may perform the conversion processing of the position coordinates. At that time, the CPU 501 transmits the position coordinates before the transformation processing and the parameters necessary for the transformation processing of the position coordinates to the camera 100.

VR Live View Display Screen

FIGS. 11A to 11D are schematic diagrams illustrating an example of a screen (display screen) displayed on the display 505 during the VR live view. FIGS. 11A to 11D illustrate display screens perceived by a user.

Figure 11A:
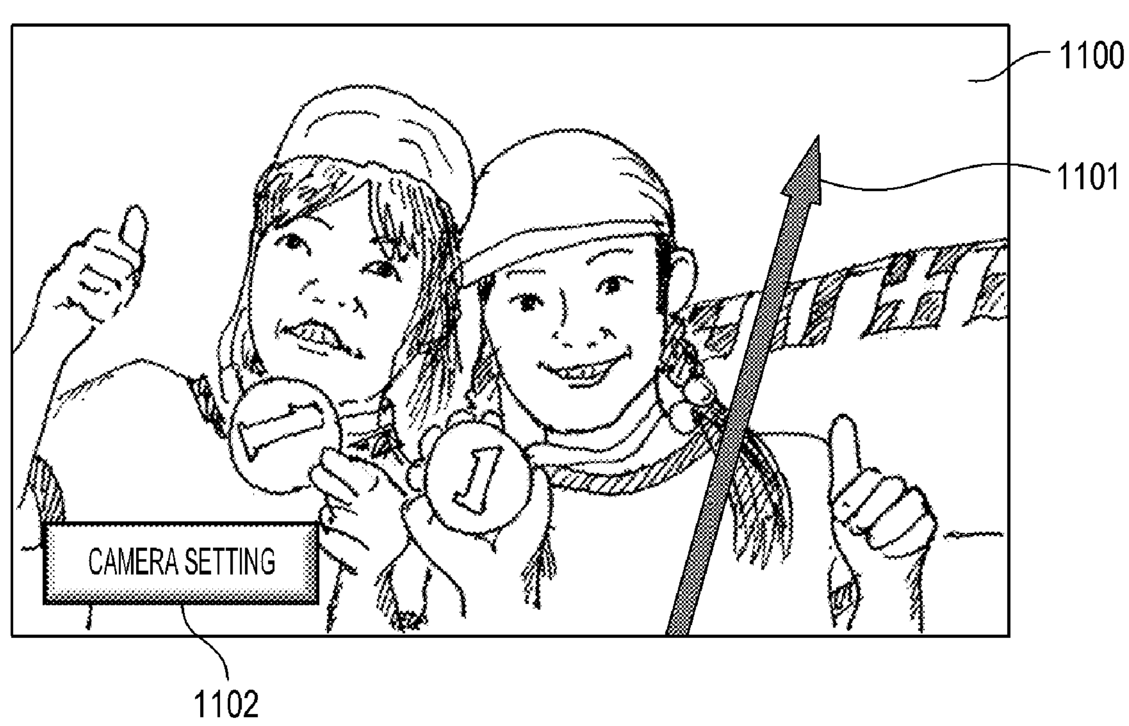
FIGS. 11A to 11D are schematic diagrams indicating a display screen.

FIG. 11A illustrates a display screen before the camera setting is started. In FIG. 11A, an arrow 1101 and a button 1102 are superimposed on a live view image 1100. The arrow 1101 indicates the direction in which the controller 516 is oriented. The direction and length of the arrow change according to the movement of the controller 516. The button 1102 is a button for starting a camera setting. The user can issue an instruction to disclose the camera settings (press the button 1102) by performing a specific operation (for example, pressing a specific button) to the controller 516 with the distal end of the arrow 1101 aligned with the button 1102. Not limited to the button 1102, the user can operate other buttons to be displayed in a similar manner.

Figure 11B:
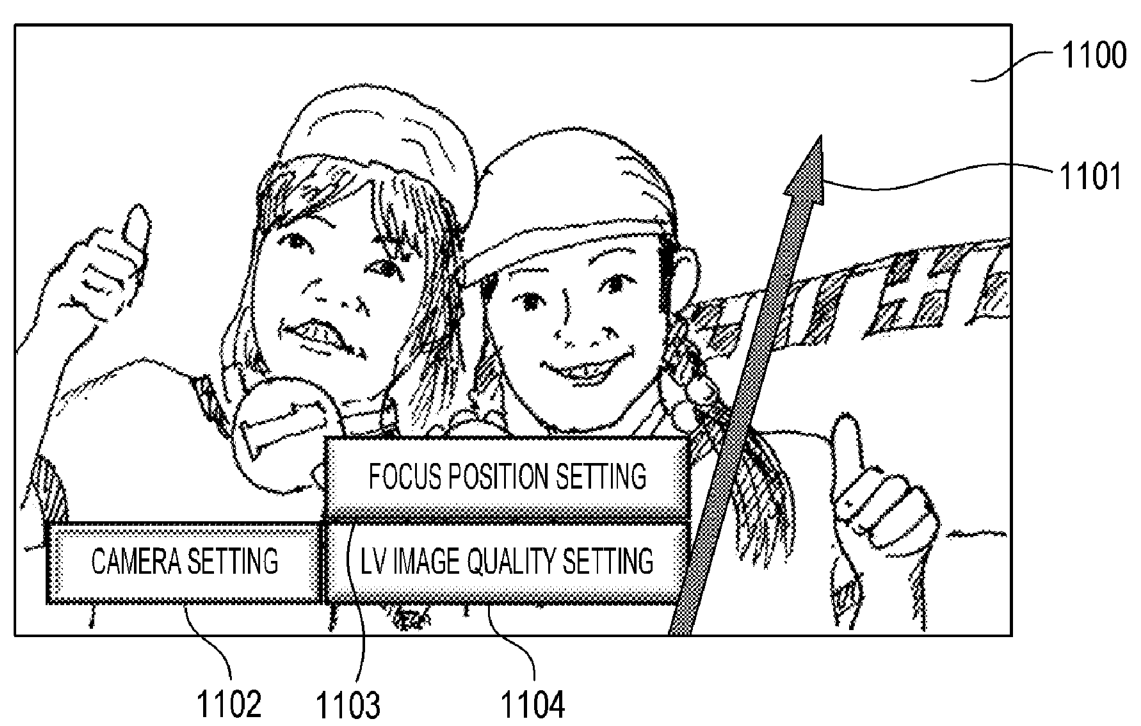

When the button 1102 in FIG. 11A is pressed, the display screen transitions from the display screen in FIG. 11A to the display screen in FIG. 11B (buttons 1103 and 1104 are displayed). The button 1103 is a button for starting setting of the focus position. The button 1104 is a button for starting setting the image quality of the live view display. The mode of the button 1102 is different between FIG. 11A and FIG. 11B, and it is possible to identify whether or not the button 1102 has been pressed.

Figure 11C:
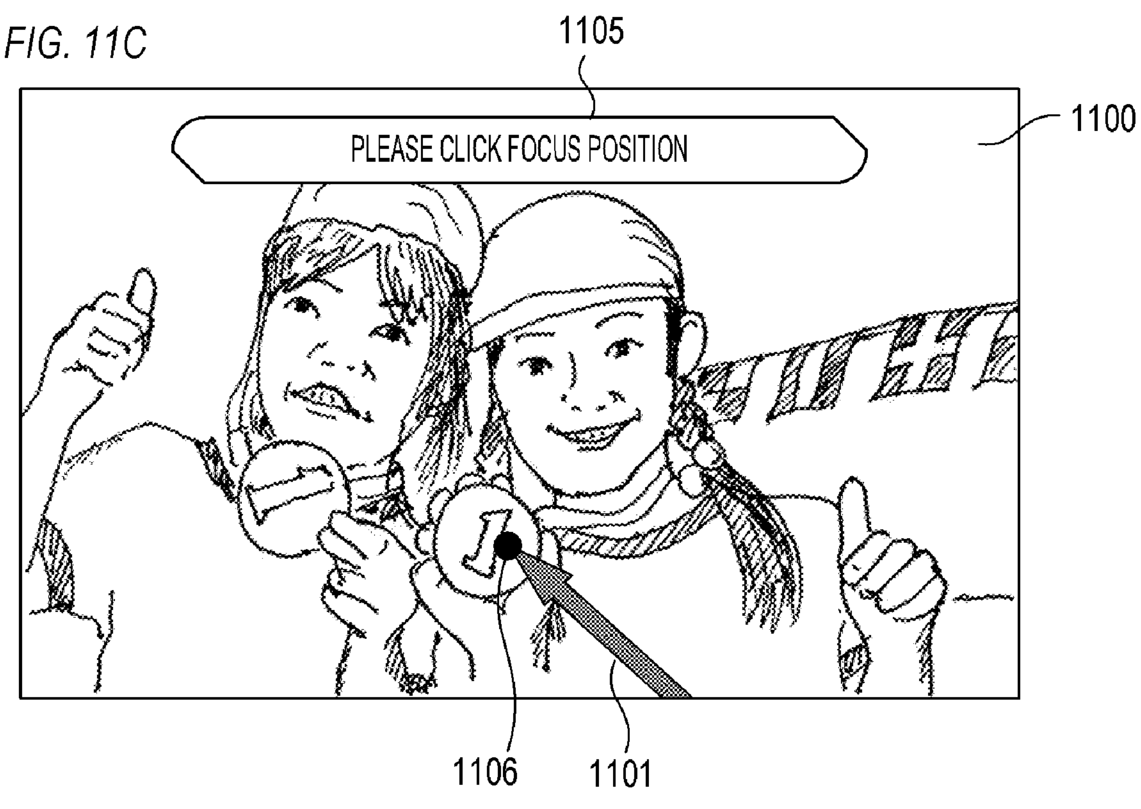

When the button 1103 in FIG. 11B is pressed, the display screen transitions from the display screen in FIG. 11B to the display screen in FIG. 11C. In FIG. 11C, the arrow 1101, a message 1105, and a pointer 1106 are superimposed on the live view image 1100. The message 1105 indicates an operation description. The pointer 1106 is an item indicating the designated position and is displayed at the distal end of the arrow 1101. Position coordinates of the pointer 1106 are obtained in step S1003 in FIG. 10. When the user performs a specific operation (for example, pressing a specific button) on the controller 516 while the display screen of FIG. 11C is being displayed, the focus position is set on the basis of the position coordinates of the pointer 1106. The setting based on the position coordinates is not limited to setting of a focus position (focus target position), and may be, for example, setting of a reference position of white balance, and the like.

Figure 11D:
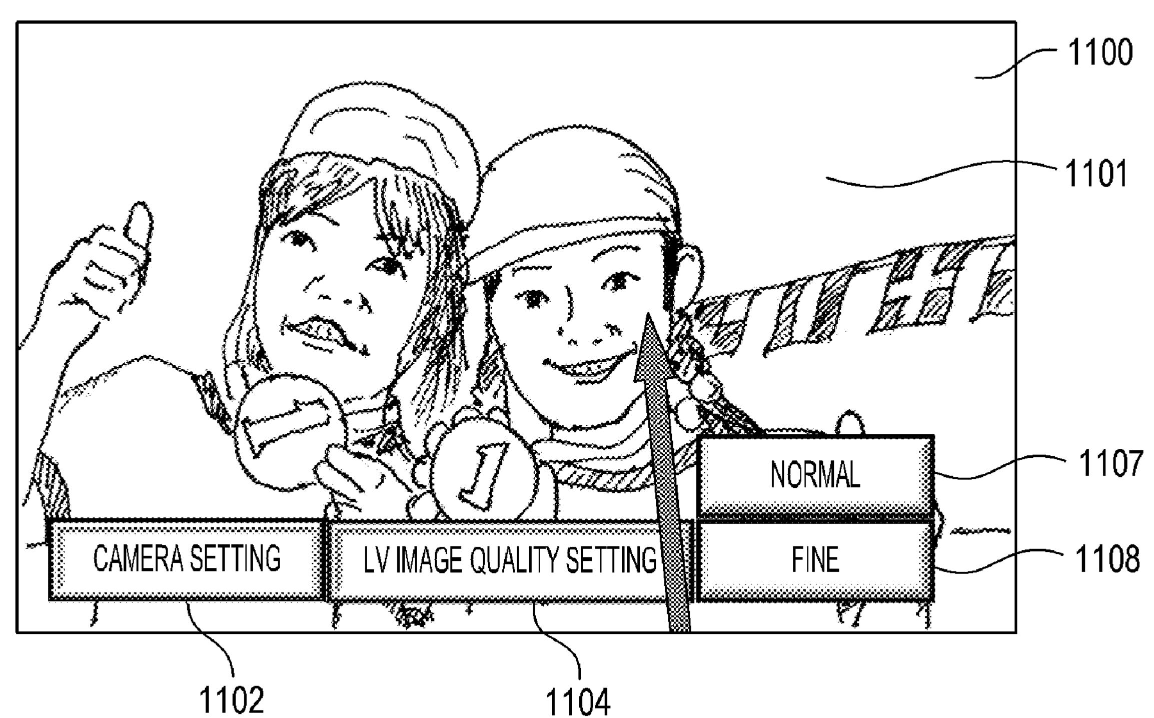

When the button 1104 in FIG. 11B is pressed, the display screen transitions from the display screen in FIG. 11B to the display screen in FIG. 11D. In FIG. 11C, the arrow 1101, the button 1102, the button 1104, a button 1107, and a button 1108 are superimposed on the live view image 1100. The button 1107 is a button for setting a NORMAL mode for performing live view display with normal image quality. The button 1108 is a button for setting a FINE mode for performing live view display with high image quality. When the button 1107 is pressed, the NORMAL mode is set, and when the button 1108 is pressed, the FINE mode is set. These settings are not based on position coordinates. The mode of the button 1104 is different between FIG. 11B and FIG. 11D, and it is possible to identify whether or not the button 1104 has been pressed.

Transformation of Position Coordinates

Figure 12A:
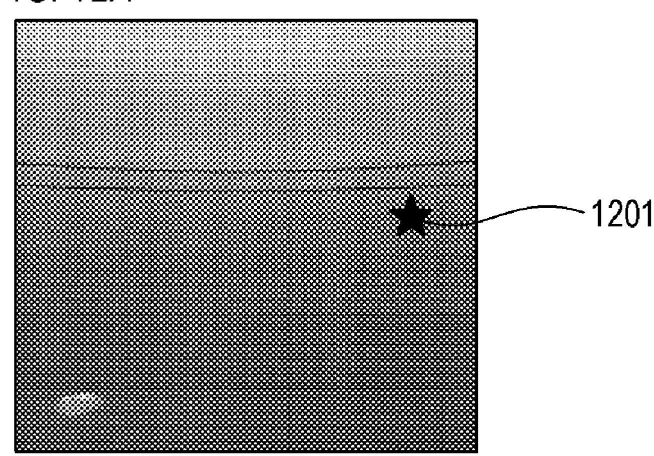
FIGS. 12A to 12C are schematic diagrams for explaining transformation of position coordinates.
Figure 12B:
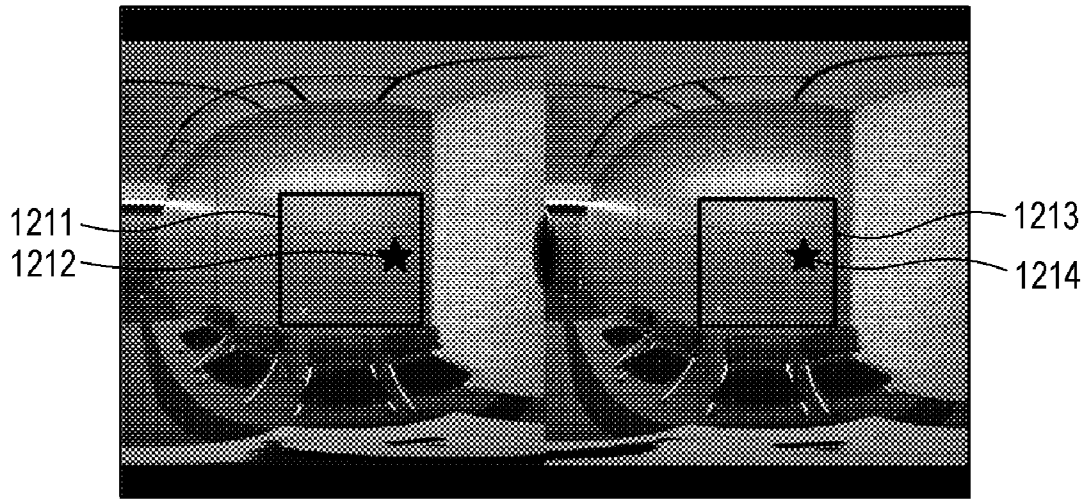
Figure 12C:
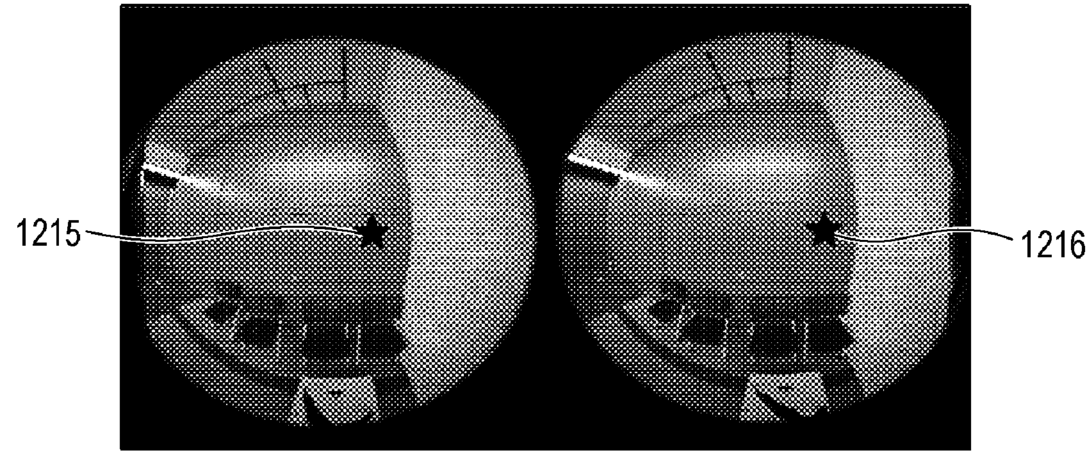

FIGS. 12A to 12C are schematic diagrams for explaining transformation of position coordinates designated by the user.

FIG. 12A illustrates an example of display screens perceived by the user. A position 1201 is a position designated by the user. In step S1003 of FIG. 10, coordinates of the position 1201 are obtained.

FIG. 12B illustrates an example of the live view image after the left-right switching processing and the equidistant cylinder transformation processing are performed. The display screen of FIG. 12A is perceived by viewing an area 1211 of FIG. 12B with the left eye and an area 1213 of FIG. 12B with the right eye. In step S1004 in FIG. 10, the coordinates of positions 1212 and 1214 in FIG. 12B are obtained from the coordinates of the position 1201 in FIG. 12A. The area 1211 and the position 1212 correspond to a left image area which is an equidistant cylindrical image area, and the area 1213 and the position 1214 correspond to a right image area which is an equidistant cylindrical image area.

FIG. 12C illustrates an example of the live view image before the left-right switching processing and the equidistant cylinder transformation processing are performed. By the processing of steps S1005 and S1006 in FIG. 10, the coordinates of the position 1212 in FIG. 12B are transformed to the coordinates of a position 1216 in FIG. 12C, and the coordinates of the position 1214 in FIG. 12B are transformed to the coordinates of a position 1215 in FIG. 12C. The position 1215 corresponds to a right image area, which is a circular fish-eye image area, and the position 1216 corresponds to a left image area, which is a circular fish-eye image area.

As described above, according to the present embodiment, while wearing the VR goggles (HMD), the user designates the position coordinates in the displayed image with the transformation processing such as the left-right switching processing and the equidistant cylinder transformation processing. Since the position coordinates are used for a camera setting after performing a transformation process opposite to the conversion process such as the left-right switching processing and the equidistant cylinder transformation processing, an appropriate camera setting (camera setting matching the user's intention) can be performed. As described above, according to the present embodiment, the user can easily perform the camera setting while wearing the HMD.

The various kinds of control to be performed by the system control unit 50 may be performed by a piece of hardware, or processing may be shared among pieces of hardware (e.g., a plurality of processors or circuits) to control the entire apparatus. Likewise, the various kinds of control to be performed by the CPU 501 may be performed by a piece of hardware or processing may be shared among pieces of hardware (e.g., a plurality of processors or circuits) to control the overall device.

Although the embodiments of the invention have been described in detail, the invention is not limited by these specific embodiments, and various forms that may be acquired without departing from the gist of the invention shall also be encompassed by the invention. Each of the foregoing embodiments merely illustrates an embodiment of the present invention, and the embodiments can be combined as necessary.

In addition, the present invention is not limited to the camera and the VR goggles, and can be applied to any electronic device as long as the electronic device can perform transformation processing of position coordinates. For example, the present invention is applicable to a PDA, a mobile-phone unit or a portable image viewer, a printer, a digital photo frame, a music player, a video game machine, and an electronic book reader. The present invention is further applicable to, for example, a video player, a display device (including a projector), a tablet terminal, a smartphone, an AI speaker, a home electrical appliance, and an on-board unit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-003930, filed on Jan. 13, 2023, which is hereby incorporated by reference herein in its entirety.

What is claimed is:

1. An electronic device comprising:

a processor; and a memory storing a program which, when executed by the processor, causes the electronic device to:

(1) acquire position coordinates designated by a user in a display image obtained by performing first transformation processing on a captured image obtained by an imaging apparatus;

(2) transform the position coordinates in the display image into position coordinates in the captured image by a second transformation processing that is an inverse transformation of the first transformation processing; and (3) perform control to perform a setting for the imaging apparatus, on a basis of the position coordinates in the captured image, wherein the captured image is an image in which two fish-eye image areas having parallax with each other are arranged side by side, and wherein the first transformation processing includes processing of transforming each of the two fish-eye image areas into an equidistant cylindrical image area.

2. The electronic device according to claim 1, wherein when the program is executed by the processor, the program further causes the electronic device to perform control to display a part of the display image on a display device, and wherein an area, in the display image, to be displayed on the display device is changeable.

3. The electronic device according to claim 2, wherein the display device is a head-mounted display device.

4. The electronic device according to claim 2, wherein the captured image is an image obtained in a state where a specific lens unit is attached to the imaging apparatus, and wherein in a case where the specific lens unit is not attached to the imaging apparatus, the control to display a part of the display image on the display device is not performed.

5. The electronic device according to claim 1, wherein the first transformation processing includes (1) processing of switching the two fish-eye image areas or (2) processing of switching two equidistant cylindrical image areas obtained by transforming the two fish-eye image areas.

6. The electronic device according to claim 1, wherein the first transformation processing includes processing of performing perspective projection transformation on a part of the equidistant cylindrical image area.

7. The electronic device according to claim 1, wherein two position coordinates respectively corresponding to two equidistant cylindrical image areas obtained by transforming the two fish-eye image areas are acquired as the position coordinates designated by the user, and wherein the control to perform the setting for the imaging apparatus is performed on a basis of position coordinates corresponding to a fish-eye image area on a predetermined side among the two position coordinates respectively corresponding to the two fish-eye image areas.

8. The electronic device according to claim 7, wherein the fish-eye image area on the predetermined side is an area corresponding to a dominant eye set in advance.

9. The electronic device according to claim 1, wherein the captured image is an image in which two fish-eye image areas having parallax with each other are arranged side by side, and wherein the first transformation processing includes processing of performing perspective projection transforming on each of the two fish-eye image areas.

10. The electronic device according to claim 9, wherein the first transformation processing includes processing of switching the two fish-eye image areas.

11. The electronic device according to claim 9, wherein two position coordinates respectively corresponding to two perspective projection image areas obtained by transforming the two fish-eye image areas are acquired as the position coordinates designated by the user, and wherein the control to perform the setting for the imaging apparatus is performed on a basis of position coordinates corresponding to a fish-eye image area on a predetermined side among the two position coordinates respectively corresponding to the two fish-eye image areas.

12. The electronic device according to claim 1, wherein the captured image is an image obtained in a state where a specific lens unit is attached to the imaging apparatus, wherein when the program is executed by the processor, the program further causes the electronic device to acquire information related to the specific lens unit attached to the imaging apparatus, and wherein the second transformation processing is performed on a basis of the information.

13. The electronic device according to claim 12, wherein in a case where a lens unit attached to the imaging apparatus is changed from a first lens unit that is a specific lens unit to a second lens unit that is a specific lens unit different from the first lens unit, information used for the second transformation processing is changed from information related to the first lens unit to information related to the second lens unit.

14. The electronic device according to claim 12, wherein the specific lens unit is a dual-lens unit capable of capturing a right image and a left image having parallax.

15. The electronic device according to claim 1, wherein in a case where a user operation not to designate position coordinates in the display image is performed as a user operation for performing setting for the imaging apparatus, (1) the second transformation processing is not performed, and (2) control to perform the setting for the imaging apparatus is performed according to the user operation.

16. The electronic device according to claim 1, wherein the control to set a focus position or a white balance reference position is performed on a basis of the position coordinates in the captured image.

17. A control method of an electronic device, the control method comprising:

acquiring position coordinates designated by a user in a display image obtained by performing first transformation processing on a captured image obtained by an imaging apparatus;

transforming the position coordinates in the display image into position coordinates in the captured image by a second transformation processing that is an inverse transformation of the first transformation processing; and performing control to perform a setting for the imaging apparatus, on a basis of the position coordinates in the captured image, wherein the captured image is an image in which two fish-eye image areas having parallax with each other are arranged side by side, and wherein the first transformation processing includes processing of transforming each of the two fish-eye image areas into an equidistant cylindrical image area.

18. A non-transitory computer-readable medium that stores a program, wherein the program causes a computer to execute a control method of an electronic device, the control method comprising:

acquiring position coordinates designated by a user in a display image obtained by performing first transformation processing on a captured image obtained by an imaging apparatus;

transforming the position coordinates in the display image into position coordinates in the captured image by a second transformation processing that is an inverse transformation of the first transformation processing; and performing control to perform a setting for the imaging apparatus, on a basis of the position coordinates in the captured image, wherein the captured image is an image in which two fish-eye image areas having parallax with each other are arranged side by side, and wherein the first transformation processing includes processing of transforming each of the two fish-eye image areas into an equidistant cylindrical image area.

* * * * *